US010999435B1

(12) United States Patent
Serna

(10) Patent No.: US 10,999,435 B1
(45) Date of Patent: May 4, 2021

(54) CUSTOMER SENTIMENT DRIVEN WORKFLOW, SAID WORKFLOW THAT ROUTES SUPPORT REQUESTS BASED ON SENTIMENT IN COMBINATION WITH VOICE-DERIVED DATA

(71) Applicant: Bank of America Corporation, Charlotte, NC (US)

(72) Inventor: Daniel J. Serna, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/856,144

(22) Filed: Apr. 23, 2020

(51) Int. Cl.
*H04M 3/51* (2006.01)
*G06Q 30/00* (2012.01)

(52) U.S. Cl.
CPC ........ *H04M 3/5175* (2013.01); *G06Q 30/016* (2013.01); *H04M 3/5166* (2013.01); *H04M 3/5191* (2013.01)

(58) Field of Classification Search
CPC ............. H04M 3/5175; H04M 3/5166; H04M 3/5191; G06Q 30/016
USPC .... 379/265.09, 242, 265.05, 265.11, 265.07, 379/88.01, 245, 246
See application file for complete search history.

(56) References Cited

U.S. PATENT DOCUMENTS

| 1,026,199 | A | 5/1912 | Bullard |
| 9,282,070 | B2 | 3/2016 | Haugen et al. |
| 9,471,883 | B2 | 10/2016 | Chatterjee et al. |
| 9,516,121 | B2* | 12/2016 | Byrd Vallieres de St. Real ......... H04L 67/22 |
| 9,699,307 | B2 | 7/2017 | Conway et al. |
| 10,007,661 | B2 | 6/2018 | Arquero et al. |
| 10,031,909 | B2 | 7/2018 | Blaschak et al. |
| 10,050,926 | B2 | 8/2018 | Ebersman et al. |
| 10,353,898 | B2 | 7/2019 | Kawecki, III |
| 10,484,540 | B2 | 11/2019 | Fang et al. |
| 2007/0172035 | A1* | 7/2007 | Sussman ............... H04M 3/493 379/37 |
| 2013/0266133 | A1* | 10/2013 | Paugam ................ G06Q 10/10 379/265.06 |
| 2014/0337257 | A1 | 11/2014 | Chatterjee et al. |
| 2016/0003492 | A1 | 1/2016 | Klein et al. |
| 2017/0185921 | A1 | 6/2017 | Zhang |

(Continued)

*Primary Examiner* — Thjuan K Addy
(74) *Attorney, Agent, or Firm* — Weiss & Arons LLP; Michael A. Springs, Esq.

(57) ABSTRACT

Systems for leveraging voice information derived from a telephone request for customer support ("RCS") are provided. The leveraging improves the accuracy of a sentiment analysis performed on a customer support request. The system includes a receiver configured to receive logins. Each login initiates a request. The request includes a date; a time of initiation; a location of a communication device that was used to communicate the request; a device identification number; a message derived from the request; and voice information. The system includes a processor configured to calculate a historical sentiment value, based, at least in part, on artifacts retrieved from historical information associated with the user. The processor obtains a voice sentiment value from the voice information. The processor calculates a total sentiment value based on the historical sentiment value and the voice sentiment value, and then routes the request based on the total sentiment value and the message.

21 Claims, 22 Drawing Sheets

(56) References Cited

U.S. PATENT DOCUMENTS

2017/0270099 A1 9/2017 Gorny
2018/0089171 A1 3/2018 Arquero et al.

* cited by examiner

US 10,999,435 B1

CUSTOMER SENTIMENT DRIVEN WORKFLOW, SAID WORKFLOW THAT ROUTES SUPPORT REQUESTS BASED ON SENTIMENT IN COMBINATION WITH VOICE-DERIVED DATA

FIELD OF TECHNOLOGY

This disclosure relates to processing customer support requests.

BACKGROUND OF THE DISCLOSURE

The disclosure is directed to receipt and processing of workflow associated with customer support requests. Often these customer support requests include information. This information typically provides indication(s) where, within an entity, to direct the customer support requests based on the indications.

Processing customer support requests appropriately can impact customer churn, company reputation, and sales revenue. A major aspect of processing customer support requests relates to routing customer support requests. Determining the optimal way, or at least a more efficient way, to route customer support requests can be difficult. Contributing to the difficulty of determining the optimal way, or at least a more efficient way, to route customer support requests is the high level of complexity associated with determining the customer's emotional state and the customer's needs attributable, at least in part, to his emotional state.

For example, routing a call from an irate customer to an automated response system may potentially further deteriorate the customer experience. Moreover, routing a call from an irate customer to an automated response system may potentially further deteriorate the customer relationship in general.

Conversely, a contented customer with a simple question may not want to be routed to a hold queue for a live operator conversation. In the case of a contented customer, directing the contented customer to an automated system or FAQ may often be appropriate.

In addition, public-facing industries incorporate trust as part of their value-add for product offerings. Thus, appropriately routing customer support requests directed to a public-facing institution often has a large impact on the reputational health of public-facing institutions.

Yet, available information directly associated with the workflow is often insufficient to completely accurately process the workflow associated with customer support requests. Accordingly, it would be desirable to increase the accuracy of the processing of workflow associated with customer support requests.

SUMMARY OF THE DISCLOSURE

A method for leveraging voice information derived from a telephone request for customer support ("RCS") is provided. The leveraging preferably improves the accuracy of a sentiment analysis performed on a customer support request. The method may include receiving voice information from a teleconference. The teleconference may include a customer support request. The customer support request may include a date of the customer support request; a time of initiation of the customer support request; a location of a communication device that was used to communicate the customer support request; a device identification number associated with the customer support request; a message derived from the customer support request; and voice information associated with the customer support request.

For each customer support request, the method may include harvesting a plurality of artifacts from social media account history and/or other third party data source information associated with a user further associated with the device identification number.

The method may further calculate, for each customer support request, a historical sentiment value. The calculation of the historical sentiment value may be based, at least in part, on the plurality of artifacts and the historical information associated with the user. The method may obtain, for each customer support request, a voice sentiment value from the voice information. Finally, the method may calculate, for each customer support request, a total sentiment value based on the historical sentiment value and the voice sentiment value, and then route the customer request based on the total sentiment value and the message.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Sentiment Analysis

Figure 1:
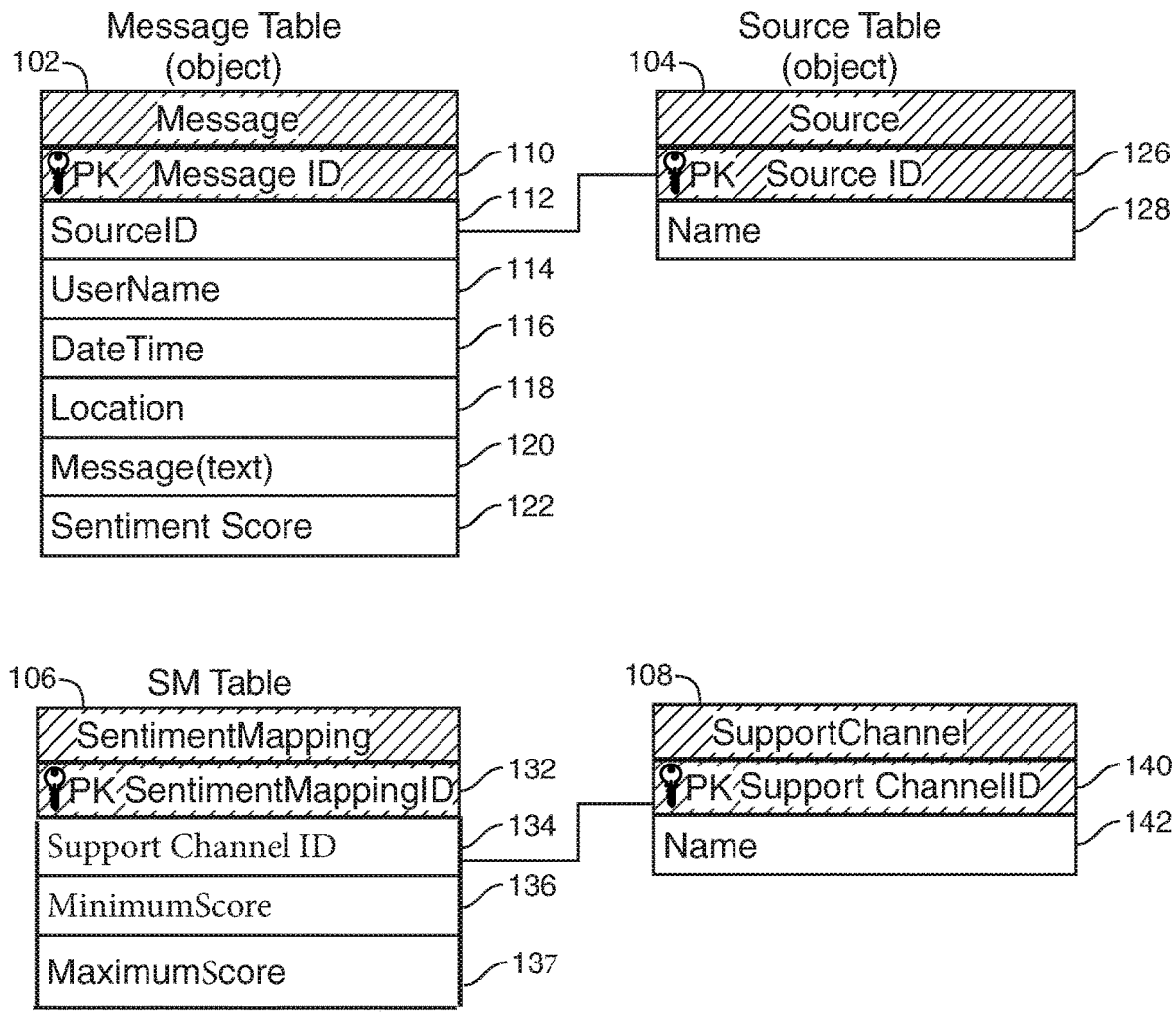
FIG. 1 shows an illustrative database diagram in accordance with principles of the disclosure.

The following discussion relates to obtaining customer-sentiment information from third party sources. These third party sources may or may not be directly related to customer support requests.

Individuals, groups and/or entities typically generate and receive private or public messages. Each of the messages typically includes some level of sentiment. Such sentiment may be used to analyze the messages to efficiently process the messages. Moreover, shifts in the sentiment from positive to negative and negative to positive, can be analyzed to help mitigate the effects of such shifts and/or to augment the benefits coincident with such shifts.

Since the advent of the digital world, the internet has provided and continues to provide a source of opinion-based information. This information may be culled from a variety of internet channels in which an entity may voice an opinion. Such internet channels may include blogs, emails, social media, chats, text messaging, message services or any other suitable opinion-voicing channel. Because of the ease associated with providing opinions, testimonials and comments on the internet, there has been a proliferation of written opinions available regarding a wide variety of topics.

Opinion-based information is used by various industries for a variety of purposes. Opinions may be used to understand the public's attitude towards a product, company or relationship. Public discourse in online sources, such as social media, may be correlated with the occurrence of real-world behavior.

It would be desirable to analyze the sentiment of publicly available consumer identifiable data to provide indicators to inform a system how to more efficiently process customer support requests.

It would be further desirable to analyze the sentiment of publicly available consumer-identifiable data to detect and then remediate difficulty or augment efficiency in communications associated with customer support requests.

Support requests, and historical communications-related thereto, in the form of email, Instant Messaging Service (IMS), phone calls, video chats, Twitter communications such as Tweets™, and other elements (e.g., response time, escalations, etc.) may be analyzed to define the sentiment of the interactions of an individual, group and/or entity towards one or more individuals, groups and/or entities and to provide a current snapshot thereof. Furthermore, these items may be used to analyze the sentiment associated with a customer as it relates to a specific customer support request.

In the current disclosure, public or semi-public information—semi-public referring to, for the purposes of this application, protected information accessible using a password or similar access code or device—can be leveraged. For example, social media information or data can be leveraged to better tune the routing and processing current or future customer support requests.

In certain embodiments, social media data may be retrieved using publically-available APIs ("Application Programming Interfaces") such as the Twitter™ API. This data may then be parsed and transformed into structured data which is then stored in a database. For the purposes of this disclosure, at least the following data points may be tracked: date, time, location username and message.

Once social media data has been retrieved, it can be parsed for sentiment analysis utilizing any number of libraries such as the Natural Language Toolkit Sentiment Library. The resulting sentiment score may be stored in a column in a table (see below, sentiment mapping table 106 in FIG. 1) tied to the relevant record.

Topic Analysis

The foregoing has been devoted, primarily, to using sentiment analysis to improve the accuracy and efficiency of responding to customer support requests. In addition, topic analysis, as described below, may also be utilized, preferably in combination with sentiment analysis but also, at times independently, to improve the accuracy and efficiency of responding to customer support requests.

For example, if the sentiment associated with a user has been determined to be happy (sentiment analysis) and the user is asking questions regarding financial instruments (topic analysis), it could be beneficial to route that customer to a new financial advisor so the new financial advisor could build up their client book with a happy user.

Conversely, if the customer is unhappy (sentiment analysis) and the customer is asking questions about financial instruments (topic analysis) it may be beneficial to route the unhappy customer to a financial advisor or portfolio manager with many years of experience. Sending an unhappy customer to a new financial advisor could further frustrate the customer.

The foregoing was one illustration of mining a combination of sentiment analysis—i.e., the sentiment state of the user—and topic analysis—i.e., the direct subject matter towards which the customer was directing his or her customer support request. It should be noted that the topic analysis could be used for many different type of topics, but that such information could preferably be mined from the customer support request using such utilities as the aforementioned libraries including, but not limited to, the Natural Language Toolkit library.

Voice Analysis

A system for leveraging voice information derived from a telephone request for customer support is provided. The system may be used to improve the accuracy of a sentiment analysis performed on a customer support request.

The system may include a receiver configured to receive voice information from a teleconference. The teleconference may be intended to communicate a customer support request.

The customer support request may include a date of the customer support request. The customer support request may include a time of initiation of the customer support request and a location of a communication device that was used to communicate the customer support request. The customer support request may also include a device identification number associated with the customer support request.

The customer support request may include a message derived from the customer support request. It should be noted that the message may be derived from the customer support request using natural language processing and/or any other suitable voice to text engine. In addition, the customer support request may include voice information associated with the customer support request.

The system may further include a processor. The processor may be configured, for each customer support request, to harvest a plurality of artifacts from a social media account history and/or other third party data source information associated with a user further associated with the device identification number. Each of the plurality of artifacts may include sentiment information relevant to the customer support request.

In certain embodiments, the processor is further configured to calculate, for each customer support request, a historical sentiment value. The calculation of the historical sentiment value may be based, at least in part, on the plurality of artifacts and the historical information associated with the user. The processor may be further configured to obtain, for each customer support request, a voice sentiment value from the voice information.

The processor may be further configured to calculate, for each customer support request, a total sentiment value based on the historical sentiment value and the voice sentiment value. The processor may also be configured to route the customer request based on the total sentiment value, a single one of the historical sentiment value and the voice sentiment value and/or the message.

In some embodiments, the relevance of the sentiment information may be inversely proportional to the magnitude of time between the date and the time associated with the artifact and the date and the time of the customer support request.

In preferred embodiments, each of the users may preferably pre-register for the sentiment analysis prior to sending in the customer support request. Such pre-registration may preferably include registering a particular device for use by the user. Thereafter, when the customer support request is communicated, the request may identify, either passively or actively, a device from which the customer support request is communicated. Then, the system may link the request with the pre-registered device. Such linking may preferably provide one exemplary way to leverage historical information about the device (or the user of the device) as part of the sentimental analysis of the customer support request.

In some embodiments, the processor may be further configured to calculate the voice sentiment value based, at least in part, on one or more of a tone of the voice, a cadence of the voice, an intensity of the voice and historical information associated with the user. It should be noted that the voice sentiment value may be calculated based on any single voice characteristic or combination of voice characteristics associated with the voice information received during the teleconference. The examples of voice characteristics set forth herein are only intended to provide examples, but not to limit or exclude any other voice characteristics which may be used to provide voice sentiment information.

It should be noted that the historical information described in this application may include a historical baseline tone of the voice, a historical baseline cadence of the voice, and a historical baseline intensity of the voice. It should be noted that the historical information associated with the voice sentiment value may be calculated based on any single voice characteristic or combination of voice characteristics associated with the voice information received during the teleconference associated with the customer support request. The examples of historical voice characteristic information set forth herein are only intended to provide examples, but not to limit or exclude any other voice characteristics which may be used to provide voice sentiment information.

AI-Bot Analysis

A system for leveraging artificial intelligence-bot (AI-bot) information derived from information included in or associated with a customer support request is provided. The leveraging preferably improves the accuracy of a sentiment analysis performed on the customer support request.

The system may include a receiver configured to receive the customer support request. The customer support request may include a date of the customer support request; a time of receipt of the customer support request, and a location of a communication device that was used to communicate the customer support request. The communication device typically includes a device identification number associated with the customer support request.

The customer support request typically includes a message.

The system may also include a processor. The processor may be configured to harvest, for each customer support request, a plurality of artifacts from a social media account history and/or other third party data source information. The artifacts may be associated with a user. The user may be associated with the device identification number. Each of the plurality of artifacts may include sentiment information relevant to the customer support request.

The processor may be further configured to calculate, for each customer support request, a historical sentiment value. The historical sentiment value may be based, at least in part, on the plurality of artifacts and historical information associated with the user. In some instances, the historical information may be retrieved from previous customer support requests associated with the same device identification number. In addition, or alternatively, the historical information may be retrieved from previous customer interactions with the entity from which the customer is requesting support.

The processor may be further configured to build a current profile for the communication device. The current profile may be based on the plurality of artifacts and the historical information.

The processor may then retrieve, from an AI-bot library, a historical profile that provides a best fit to the current profile. The processor may be further configured to route the customer request based on the historical profile.

The historical profile may preferably account for success and/or failure of previous responses to the user legacy customer support requests. For example, a particular user may have flagged historically difficult situations with an "urgent" indicator included in an e-mail.

Such an indicator may have been properly responded to in the past by routing the legacy "urgent" customer support request to a live operator. A proper response may have generated positive customer feedback; which may also be recorded and may be used to form a part of the historical profile.

Such an indicator may have been improperly responded to in the past by routing the legacy "urgent" customer support request to an Interactive Voice Response (IVR) system. The improper response may have generated negative customer feedback; which may also be recorded and used to form the historical profile.

In certain embodiments, the relevance of the sentiment information may be inversely proportional to the magnitude of elapsed time between the date/time associated with the artifact and the date/time associated with the customer support request.

The receiver, in certain embodiments, may be further configured to receive a pre-registration, from each communication device. The pre-registration may preferably occur prior to receiving the customer support request.

In some embodiments, the processor may be configured to calculate the best fit based, at least in part, on historical information received in the past three months. As noted below, the comparison between the current profile and a best fit historical profile may be implemented using other data comparison strategies.

The processor may also, in certain embodiments, be further configured to calculate the best fit based, at least in part, on historical information received from users within the same zip code as the communication device.

The message may be derived from the customer support request using natural language processing.

It should be noted as well that the routing the customer support request may also include selecting a level from among a plurality of levels defined in a vertical stratification of the entity. Thereafter, the routing the customer support request may involve matching the selected level with information contained within the message. The matching may include determining a threshold level of matching between the message and the level.

The foregoing are examples of analyses that an AI-bot may use. These foregoing examples may be characterized as using legacy customer support requests to tune a response to a current customer request. It should be noted that other suitable information may be used to tune a response to a current customer request.

FIGURES

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a possible database implementation of a system according to the invention. Specifically, FIG. 1 shows an entity relationship map 100 for customer sentiment. While map 100 relates to customer sentiment, it should be noted that map 100 could be used to illustrate any suitable relationship sentiment according to the embodiments set forth herein.

Message 102 (which is in the form of a table which is a database object) contains various attributes relating to the message. The exemplary information included in message table 102 is a message ID 110, source ID 112, username 114, date/time 116, location 118, message (text) 120, and/or sentiment score 122.

Message ID 110 is the primary key (indicated by a key icon labelled PK) for message table 102. As such, message ID 110 represents the only necessarily unique attribute of message 102.

Source 104 (which is also in the form of a table) provides attributes regarding the source ID. Attributes for source 104 include source ID 126 and name 128. Source ID 126 is the primary key for source 104. As such, source ID 126 represents the only necessarily unique attribute of source 104.

Sentiment mapping 106 (which is also in the form of a table) provides attributes regarding the formation and utilization of the sentiment score. Attributes for sentiment mapping 106 include sentiment mapping ID 132, support channel ID 134, minimum score 136 and maximum score 137. Sentiment mapping ID 132 is the primary key for sentiment mapping 106. As such, sentiment mapping ID 132 represents the only necessarily unique attribute of sentiment mapping 106.

Table 108 is a support channel table. Attributes for support channel may include support channel ID 140 and name 142. Support Channel ID 140 is the primary key for support channel 108. As such, support channel ID 140 represents the only necessarily unique attribute of support channel 108.

The tables described above in FIG. 1 may be leveraged, in some embodiments, as follows: Message 102 may preferably include a message, which includes a support request. Source ID 104 may preferably include lineage information relating to the data in the message. Sentiment mapping 106 may preferably include information, based at least in part on sentiment, regarding how to appropriately respond to the content as further tuned using sentiment in the message. In some embodiments, the triggering device (not shown) may preferably monitor the information and trigger a sentiment mitigation (to offset a negative sentiment) or sentiment augmentation (to enhance a positive sentiment) response when instructed.

Some embodiments present a hierarchical response (see FIGS. 11 and 12 below, and the portion of the specification corresponding thereto) to represent and/or help guide the routing of the support request based on the entity hierarchy.

Social media data sets are typically extremely large and unstructured. The large size and lack of structure can make social media data sets challenging to analyze and manipulate through traditional methods. It should be noted that a visual interface accordingly to the embodiments simplifies analysis and enables users to more quickly address requests—which may be particularly significant when those requests include negative sentiment. Further—the visual interface can be used to automatically trigger response(s) to such detected sentiment(s) or sentiment trends. Such responses may remediate alert conditions and/or correct sentiment issues preferably simultaneously to the display of such conditions. Such responses may alternatively include augmenting positive results obtained from requests associated with positive sentiment.

Also, in the event that the support requests, and ensuing communications exchanged between a first individual, group or entity and a second individual, group or entity, are less positive than the support requests, and ensuing communications between the first individual, group or entity and a third individual, group or entity, requests between the first individual, group or entity and the second individual, group or entity may be rerouted for response by the third individual, group or entity and not for response by the second individual, group or entity.

Figure 2:
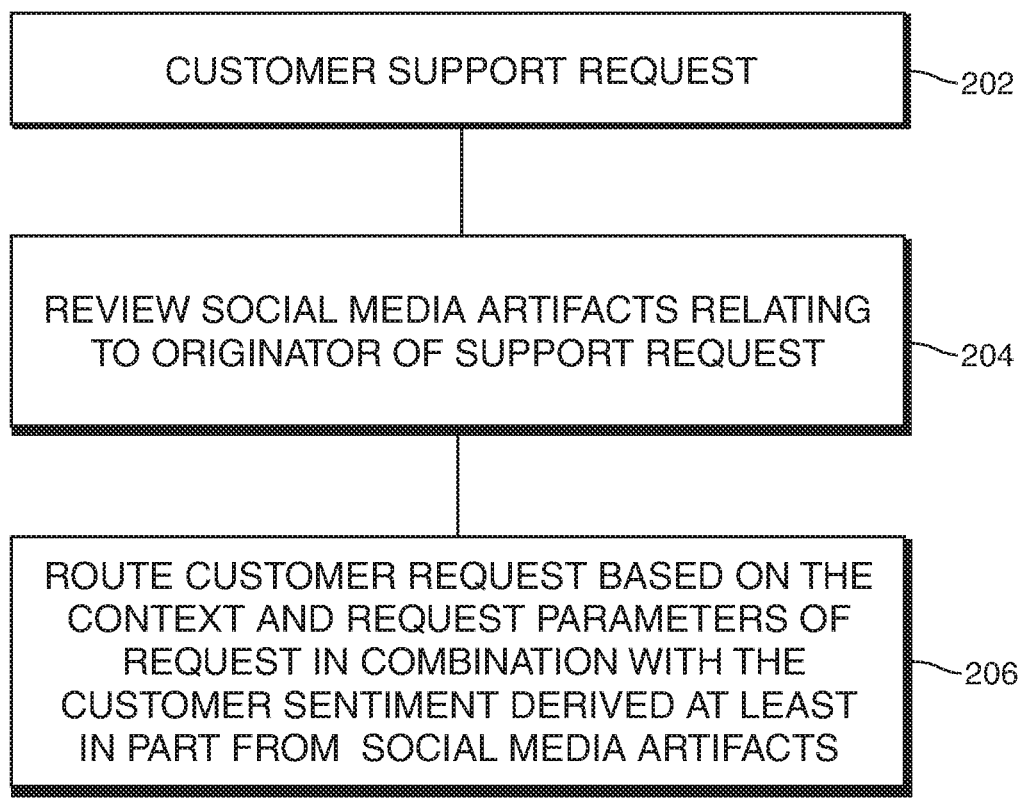
FIG. 2 shows an illustrative diagram in accordance with principles of the disclosure.

FIG. 2 shows an illustrative flow diagram showing intake of a customer support request, at 202. At step 204, the diagram shows reviewing social media artifacts relating to an originator of the support request. Finally, at step 206, the diagram shows routing the customer support request based on 1) a localized context and various request parameters associated with the request in combination with 2) the customer sentiment derived from social media artifacts.

Figure 3:
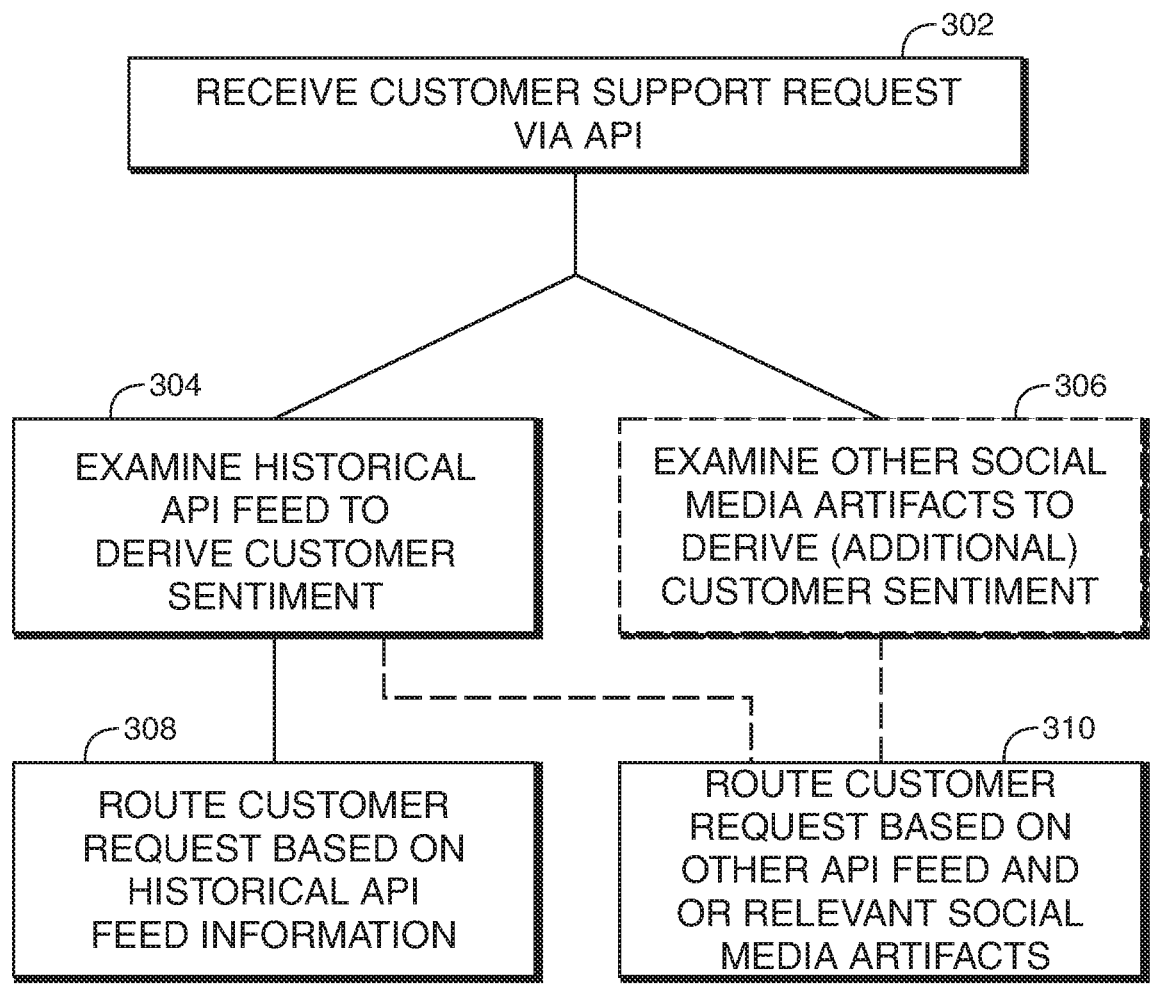
FIG. 3 shows another illustrative diagram in accordance with principles of the disclosure.

FIG. 3 shows a more specific rendering of an illustrative flow diagram for a method associated with a customer support request routing system. In the diagram in FIG. 3, an API, such as Twitter™, receives a support request. This is shown at step 302.

Step 304 shows examining historical events on the API feed which received the support request. In addition, embodiments may include examining historical events on an API feed other than the API feed which received the support request. In any case, embodiments teach routing the customer support request based at least in part on historical API feed information, as shown at 308.

Some embodiments, as shown at step 306, may include examining other social media artifacts to derive (additional) customer sentiment regarding the customer associated with the transmitting of the customer support request. Such customer may be identifiable based on information in the request.

Thereafter, step 310 shows routing customer support request based on other API feed information and/or relevant social media artifacts. From the foregoing it has been shown that a customer support request may be routed based on information derived from examination of historical API feeds as well as relevant social media history.

Figure 4:
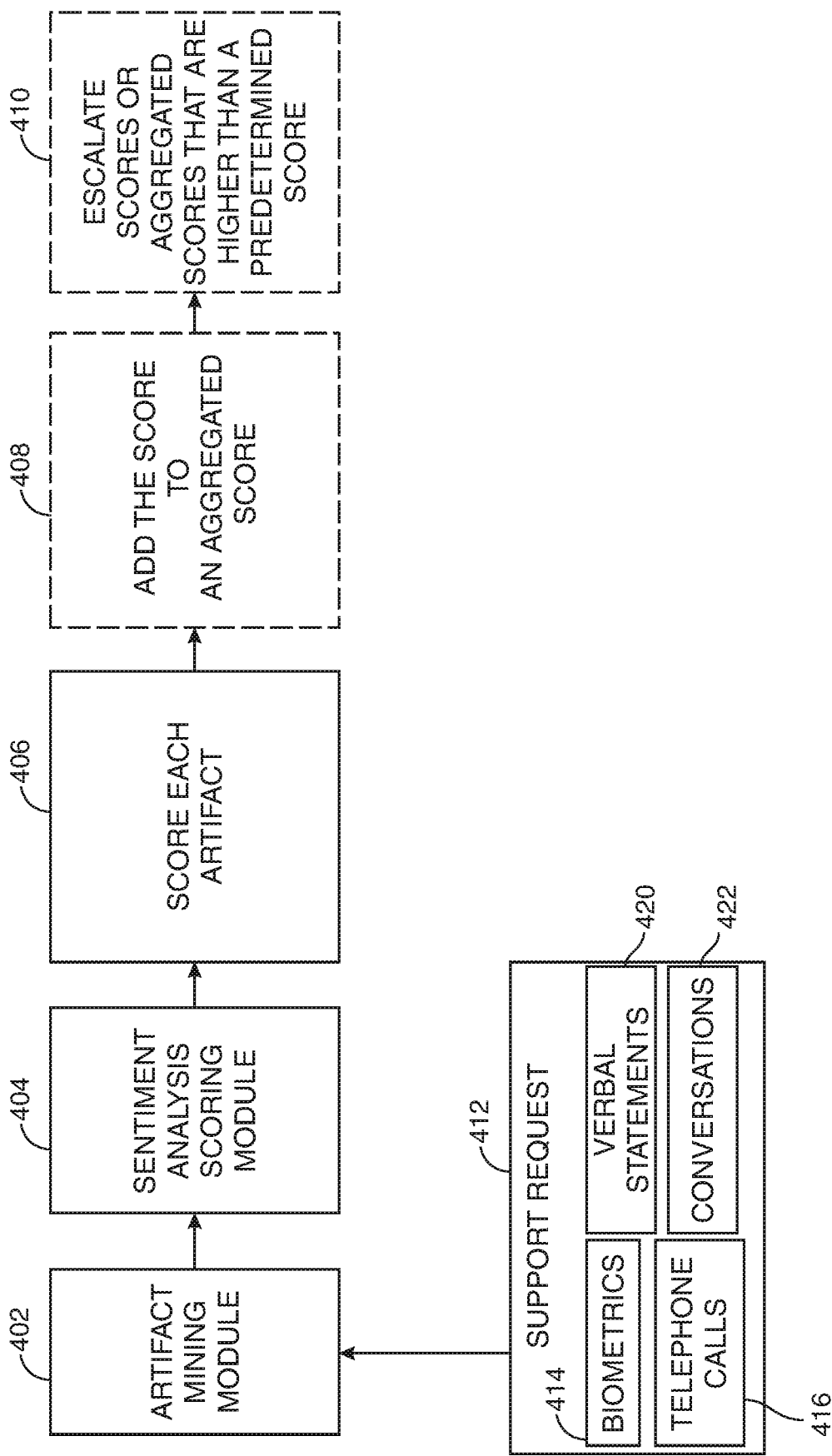
FIG. 4 shows yet another illustrative diagram in accordance with principles of the disclosure.

FIG. 4 shows an illustrative flow diagram which sets forth a general overview of the embodiments of the disclosure. At 400, a support request from an individual is received. Mining module, shown at 402, may mine a plurality of artifacts, as shown at 412. The artifacts may be received in the form of biometrics 414, telephone calls 416, verbal statements 420, conversations 422, SMS ("Short message service") 422 and phone calls 424. The artifacts may be associated with the customer support requests.

Upon retrieval of one or more artifacts by artifact mining module 402, sentiment analysis scoring module 404 may analyze each of the support requests in view of the artifacts retrieved that relate to the support request.

The support requests may be analyzed based on a variety of different scoring models. The variety of different scoring models may include a polarity-based scoring model, a multi-dimensional vector-based scoring model and a two-dimensional scoring model. The different scoring models will be described in greater detail below.

The sentiment analysis scoring module may determine a score for each support request. The score may be a composite score retrieved from numerous scoring models. The score may be a single number score. The score may be a vector.

Upon determination of a score for each of the support requests, a receiving individual, group or entity may be determined for each support request. It should be appreciated that the score determination may be updated periodically, or continuously, after a customer support request transmission.

As described above, a plurality of artifacts may be retrieved in connection with the support request. The plurality of artifacts may be derived, and scored, in connection with a transmitting individual, group and/or entity, as shown at 406.

In certain embodiments, the sentiment score derived at 406 may be added to an aggregate score, as shown at 408. Once normalized, the aggregate score may more accurately reflect the sentiment state of the customer requesting the support. Step 410 shows escalating scores or aggregate scores that are higher than a predetermined score, or higher than a predetermined aggregate score, respectively.

An optimal, or appropriate, receiving designee may be determined based on an algorithmic assessment of a responder to whom the support request should be sent. Thereafter, a communication link for bilateral communication between the transmitter and receiver may be determined.

The communication link may link the transmitting individual, group and/or entity to the receiving receiver. In certain embodiments, a communication link, a receiver, or any other suitable designee may be associated with an aggregated score.

In one approach, the artifact and scores are maintained and the average is completely re-executed each time a new artifact is received.

Scores may range from healthy and balanced support request scores to non-healthy and urgent support request scores. Scores that are greater than a predetermined score may include scores that indicate a support request that may be weighted for a high level of urgency or otherwise weighted.

There may be various response and/or remediation measures that may be implemented to respond to the customer support request and to lower the score in a dynamic fashion, as described in more detail below. The measures may include routing the support request to a live responder, or other similar high-resource type response, as opposed to sending the support request for response by an automated response queue, and/or implementing any other suitable remediation measures.

Figure 5:
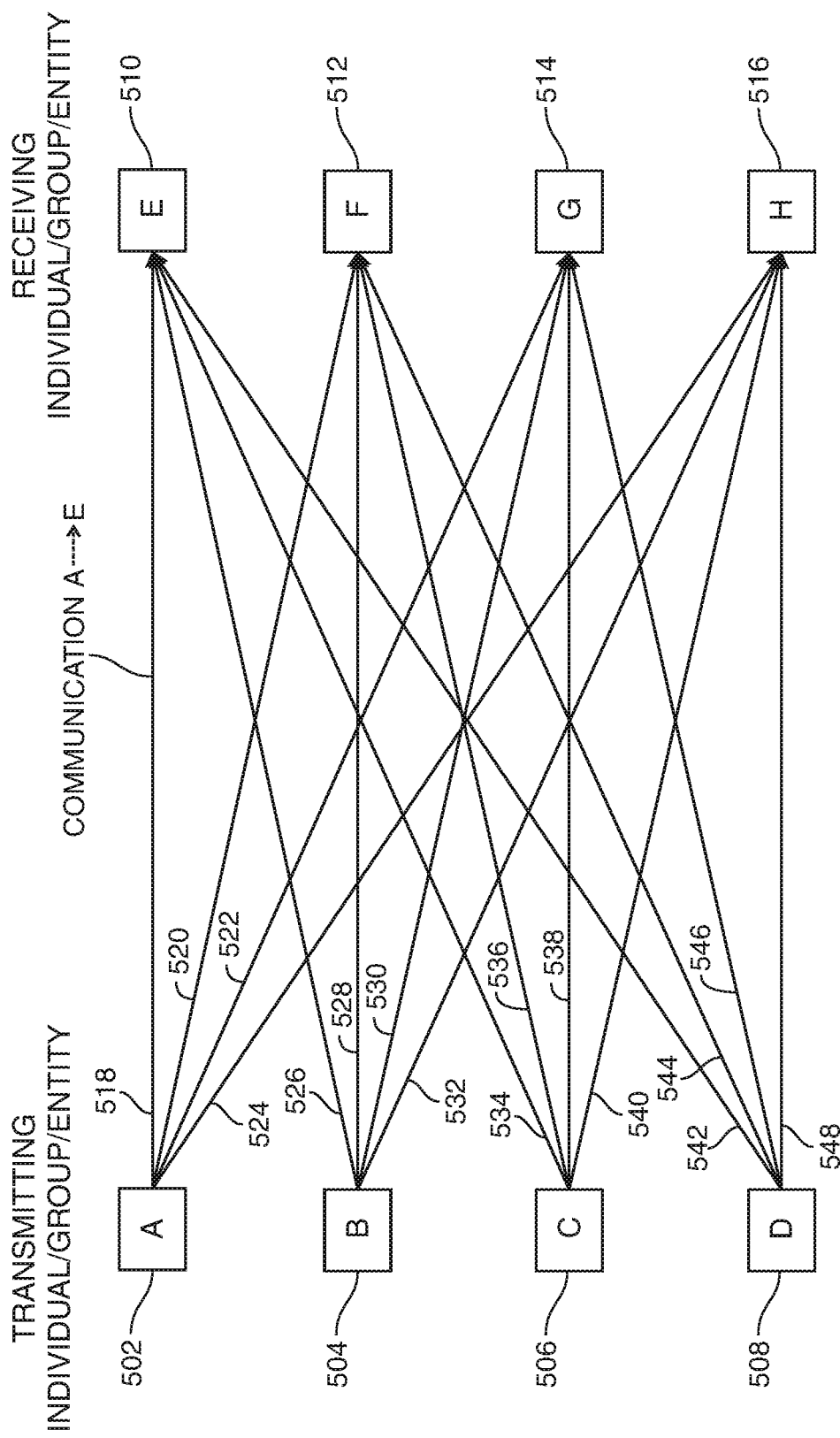
FIG. 5 shows still another illustrative diagram in accordance with principles of the disclosure.

FIG. 5 shows an illustrative communications map. The illustrative communications map may include a variety of individuals, groups and/or entities. The individuals, groups and/or entities shown include entity A (shown at 502), entity B (shown at 504), C (shown at 506), D (shown at 508), E (shown at 510), F (shown at 512), G (shown at 514) and H (shown at 516).

Individuals, groups and/or entities A, B, C and D are shown as transmitting individuals, groups and/or entities. A, B, C and D may represent support requestors. Individuals, groups and/or entities E, F, G and H are shown as receiving individuals, groups and/or entities. E, F, G and H may represent support request responders.

Each individual, group and/or entity may be in communication with one or more of the other individuals, groups and/or entities. The communications may be conducted over communication lines. The communication lines may be virtual communication lines, wired communication lines, wireless communication lines, communication lines that utilize a network or any other suitable communication lines.

Each communication line shown may connect two or more individuals, groups and/or entities. It should be appreciated that, although the communication lines shown connect A, B, C and D to E, F, G and H, there may be additional communication lines that are not shown. In some embodiments, communication lines may enable communication among requestors A, B, C and D, and and/or responders E, F, G and H.

Each communication line may enable one-way or two-way communications. Communication lines that enable one-way communication may push communications from a first individual, group or entity to a second individual, group or entity. Communication lines that enable two-way communications may push communication from a first individual, group or entity to a second individual, group or entity, and from the second individual, group or entity to the first individual, group or entity. Communication lines that are one-way may be parallel to a second communication line that enables the reverse of the one-way communication line. For example, if a first communication line enables one-way communication from entity A to entity E, a parallel communication line may enable one-way communication from entity E and entity A.

Communication lines shown may include 518 (A-E), 520 (A-F), 522 (A-G), 524 (A-H), 526 (B-E), 528 (B-F), 530 (B-G), 532 (B-H), 534 (C-E), 536 (C-F), 538 (C-G), 540 (C-H), 542 (D-E), 544 (D-F), 546 (D-G) and 548 (D-H).

Figure 6:
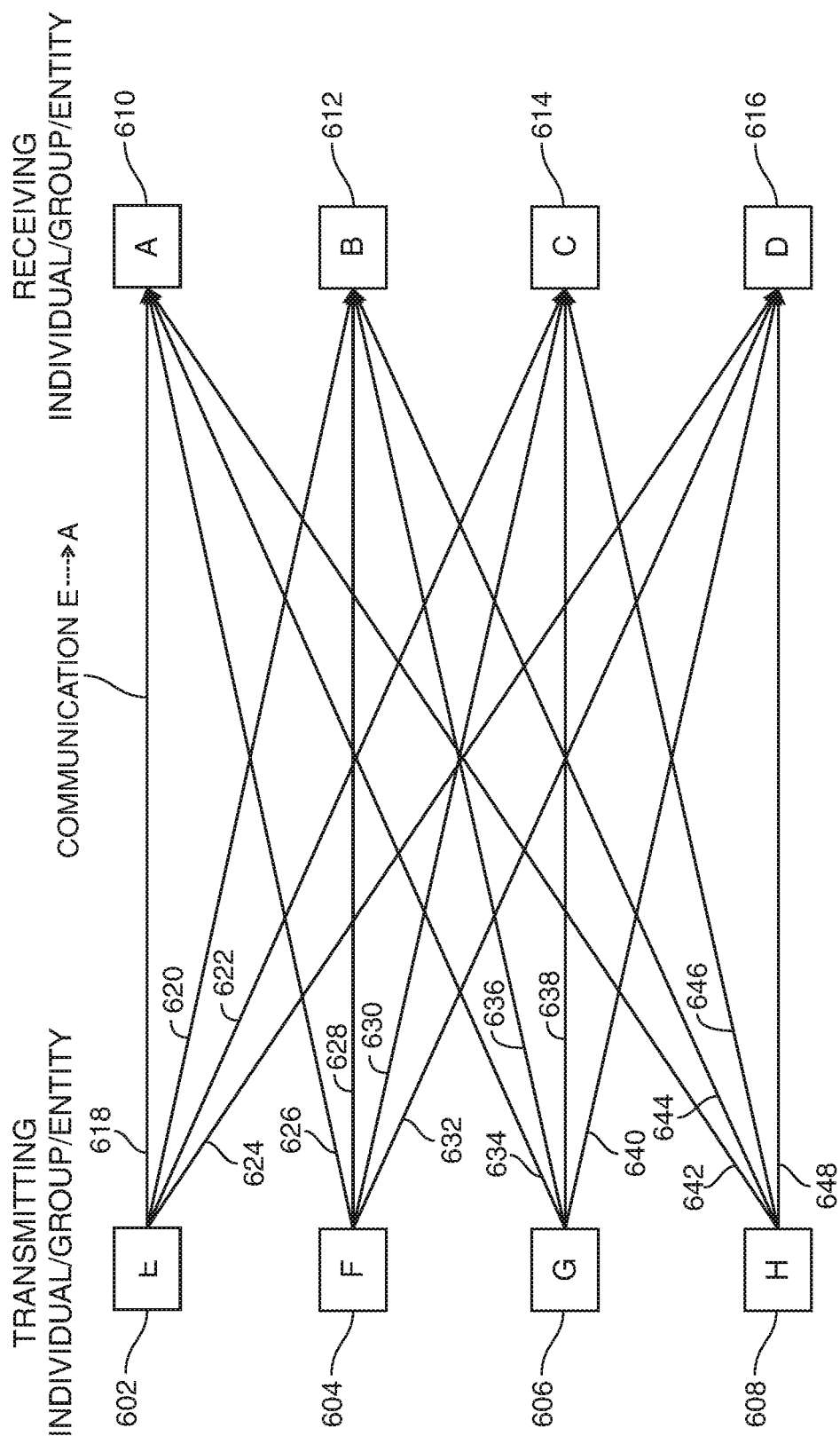
FIG. 6 shows yet another illustrative diagram in accordance with principles of the disclosure.

FIG. 6 shows another illustrative communications map. The communications map may show individual, group or entity E (shown at 602), individual, group or entity F (shown at 604), individual, group or entity G (shown at 606) and individual, group or entity H (shown at 608) communicating with individual, group or entity A (shown at 610), individual, group or entity B (shown at 612), individual, group or entity C (shown at 614) and individual, group or entity D (shown at 616).

It should be appreciated that, although the communication lines shown connect individuals, groups or entities E, F, G and H to individuals, groups or entities A, B, C and D, there may be additional communication lines that are not shown. In some embodiments, communication lines may enable communication among individuals, groups or entities E, F, G and H, and among individuals, groups or entities A, B, C and D.

Each communication line may enable one-way or two-way communications. Communication lines that enable one-way communication may push communications from a first individual, group or entity to a second individual, group or entity. Communication lines that enable two-way communications may push communication from a first individual, group or entity to a second individual, group or entity, and from the second individual, group or entity to the first individual, group or entity. Communication lines that are one-way may be parallel to a second communication line that enables the reverse of the one-way communication line. For example, if a first communication line enables one-way communication between individual, group or entity A and individual, group or entity E, a parallel communication line may enable one-way communication between individual, group or entity E and individual, group or entity A.

Communication lines shown may include 618 (E-A), 620 (E-B), 622 (E-C), 624 (E-D), 626 (F-A), 628 (F-B), 630 (F-C), 632 (F-D), 634 (G-A), 636 (G-B), 638 (G-C), 640 (G-D), 642 (H-A), 644 (H-B), 646 (H-C) and 648 (H-D).

Figure 7:
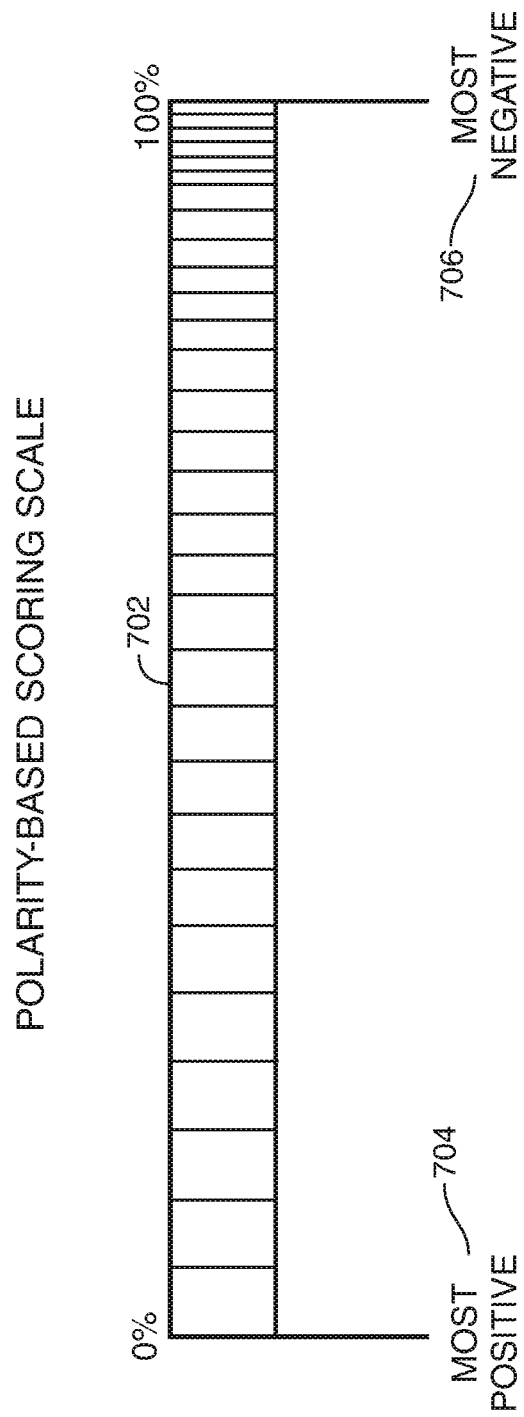
FIG. 7 shows still another illustrative diagram in accordance with principles of the disclosure.

FIG. 7 shows an illustrative scoring scale. There may be various different methods or scales for scoring support requests to formulate an aggregate score for the support request. For example, a support request may be scored based on its immediate characteristics. In addition, the score for the support request may be influenced by positive or negative sentiment derived from artifacts associated with the requestor.

A support request may be scored based on polar emotions, such as happy or sad. A support request may be scored in a non-polar scale, such as a vector scaling model. A support request may be scored on a collection of multiple sentiment scoring methods or models.

Polarity-based scoring scale 702 is shown in FIG. 7. In such a scoring scale, each support request is scored on a polar scale using linguistic scoring methodology. Linguistic scoring methodology may utilize various language scoring methods, such as natural language processing, computational linguistics and biometrics. For the purposes of this application, natural language processing should be understood to refer to Natural Language Processing (NLP) is a subfield of linguistics, computer science, information engineering and artificial intelligence concerned with the interactions between computers and human (natural) languages. In particular, NLP refers to how to program computers to process and analyze large amounts of natural language data.

The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, the text analysis may analyze key words and phrases, emoticons, characters, length of response, response time between artifacts, related artifacts, negation, exaggeration, jokes and sarcasm.

Based on the linguistic scoring methodology, each artifact may be scored on a scale of 0% to 100%, as shown at 704 and 706, respectively. 0% may indicate most positive and 100% may indicate most negative, or in the alternative 0% may indicate most negative and 100% may indicate most positive.

It should be appreciated that a polarity-based scale may include two opposite emotions, whether positive and negative, happy and sad or any other suitable opposite emotions. Therefore, each support request scored on a polarity-based score may only be given a sentiment score based on the polarity of the support request. However, at times, in order to compensate for the shortcomings of the polarity-based scoring models, an artifact may be scored on multiple polarity-based scoring models, and, the results of the scoring models may be combined.

Figure 8:
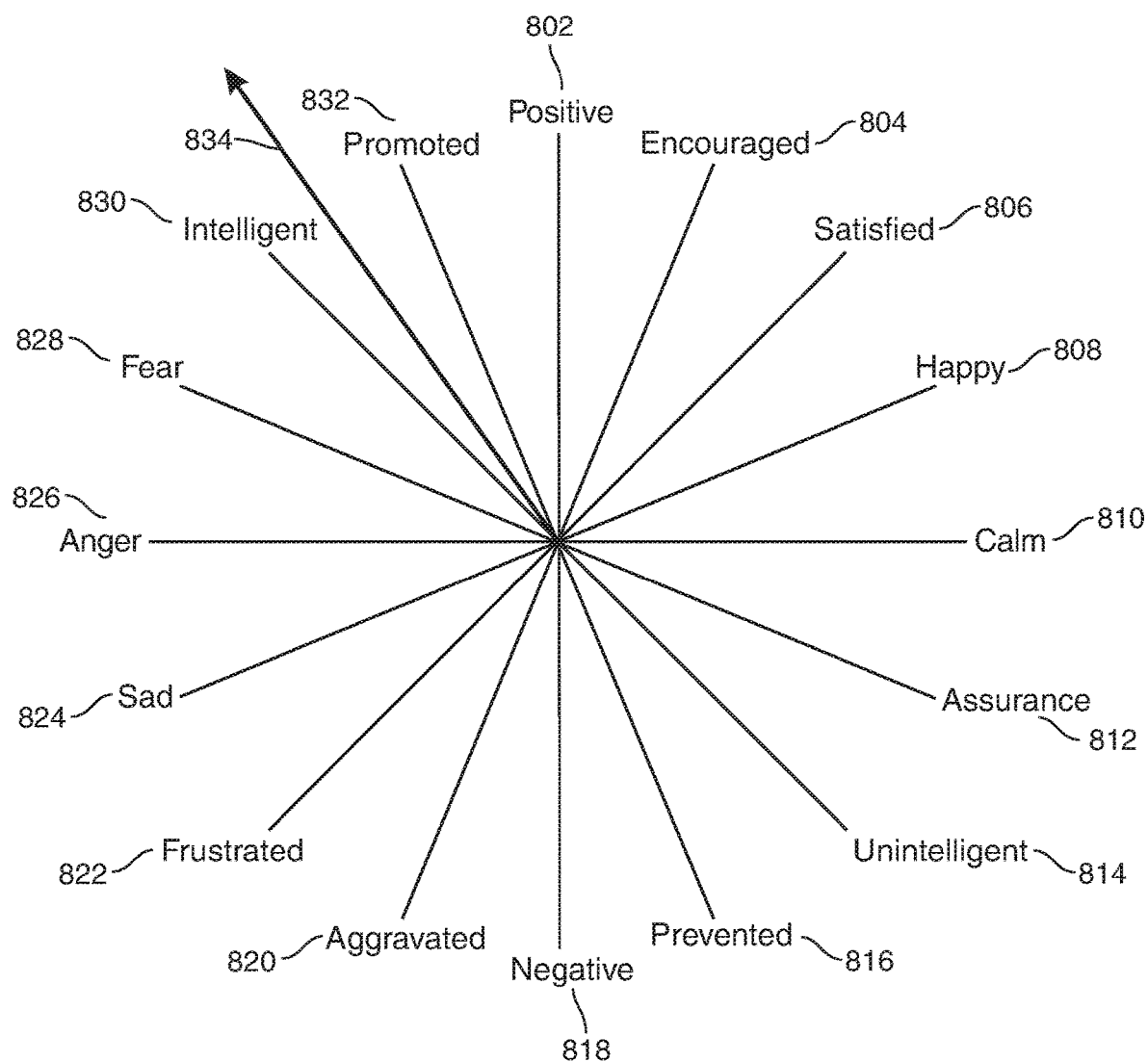
FIG. 8 shows yet another illustrative diagram in accordance with principles of the disclosure.

FIG. 8 shows a multi-dimensional scoring scale. The multi-dimensional scoring scale may include a plurality of vectors. Each of the vectors may correspond to a different emotion or sentiment. The emotions, or sentiments shown, may include positive (802), encouraged (804), satisfied (806), happy (808), calm (810), assurance (812), unintelligent (814), prevented (816), negative (818), aggravated (820), frustrated (822), sad (824), anger (826), fear (828), intelligent (830) and promoted (832).

Vector 834 may be a vector generated from a support request. The support request may include a plurality of attributes. The support request may be broken down into component parts. The attributes and the component parts may be used to plot the support request on the multi-dimensional scoring scale.

The sentiment of the support request plotted as vector 834 may be shown in-between intelligent and promoted. It should be appreciated that the multi-dimensional scoring scale may be used to determine the sentiment of a support request—with or without sentiment adjustment associated with retrieved artifacts.

The multi-dimensional scoring scale may include a plurality of other emotions, not shown. In some embodiments, the multi-dimensional scoring scale may utilize any suitable emotion chart.

Figure 9:
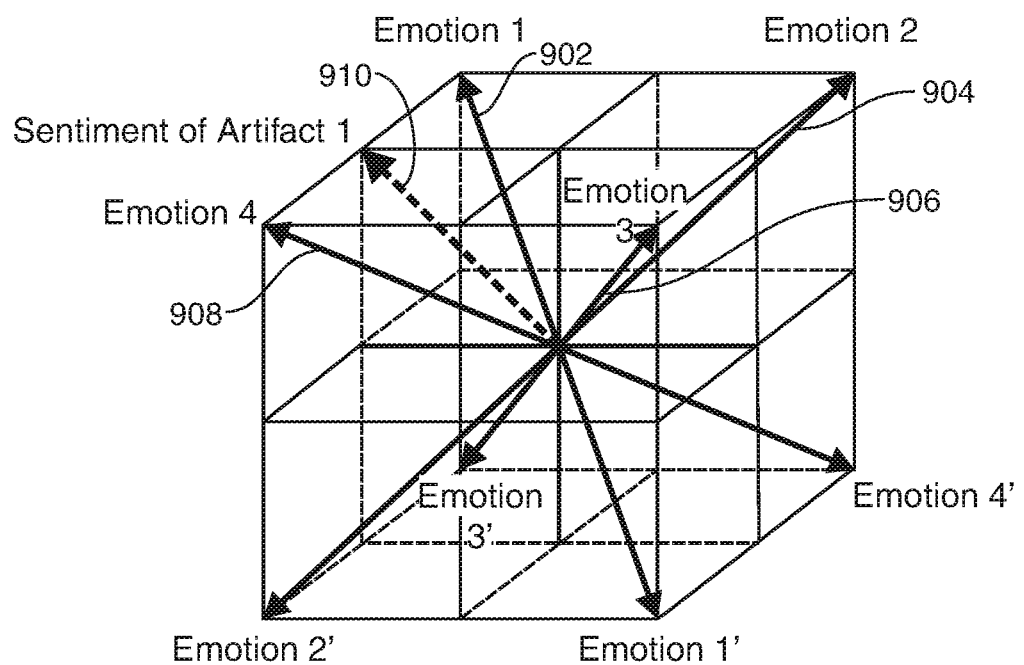
FIG. 9 shows an illustrative matrix in accordance with principles of the disclosure.

FIG. 9 shows another multi-dimensional scoring scale. The multi-dimensional scoring scale may be three-dimensional. The three-dimensional scoring scale may include an x-dimension (horizontal), a y-dimension (vertical) and a z-dimension (depth; in the two-dimensional representation of the figure, into and out of the plane of the page). Vectors that represent emotions may be plotted on the three-dimensional scoring scale.

A vector may have multiple dimensions, such as an x-dimension, a y-dimension and a z-dimension. As such, a vector may be plotted on the three-dimensional scoring scale that comprises an x-dimension, y-dimension and z-dimension. Each plotted emotion may be represented by a vector, such as vector 902 that represents emotion 1, vector 904 that represents emotion 2, vector 906 that represents emotion 3 and vector 908 that represents emotion 4.

Build of a vector, or orientation of a vector, could be based on one or more of a combination of sentiments or emotions. In some embodiments, vector length could correspond to magnitude or intensity of a vector.

Each plotted vector that represents an emotion may have two extremes. For example, a vector may represent a range of happiness and sadness. Each point of the vector may represent a different value in the range of happiness and sadness. At the (0,0,0) point, the vector may represent neutrality—e.g., neither happy nor sad. The further a location points found on the vector is above the (0,0,0) point may represent an increasing degree of happiness over neutrality, while the further a location point found below the (0,0,0) point may represent an increasing degree of sadness over neutrality.

Upon the receipt of a support request, the support request may be broken down into component parts. The component parts may be used to generate a vector. The vector may be plotted on a multi-dimensional scoring scale, such as the one shown in the matrix depicted in FIG. 9. Such a vector may be shown at 910. Vector 910 may represent the sentiment of artifact 1. Such an artifact may be retrieved as it relates to a pre-determined customer support request.

Because sentiment of a support request may be multi-faceted—i.e., may include multiple emotions—vector 910 may represent the sentiment of support request with respect to the emotion vectors.

In some embodiments, the emotion vector, or vectors, that most closely represents the sentiment of the support request may be displayed to the user. In certain embodiments, a detailed score including the various components of the support request may be shown.

Figure 10:
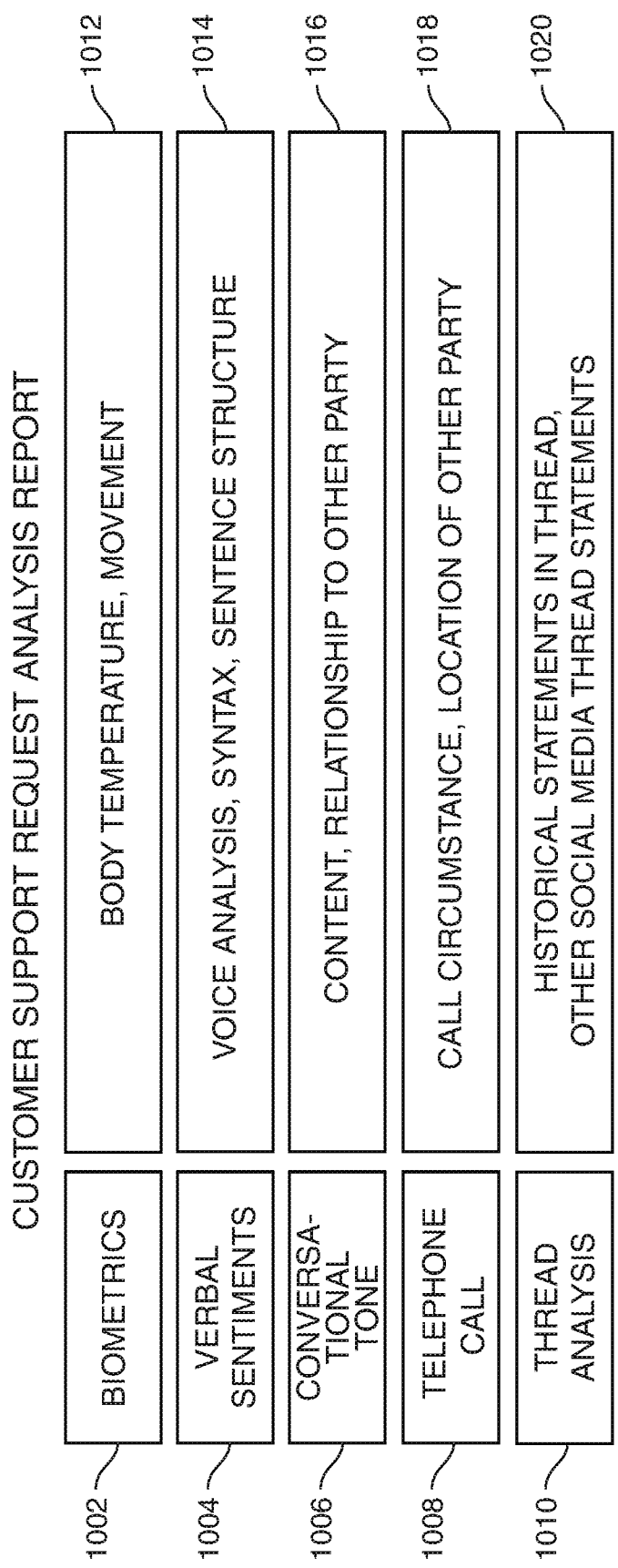
FIG. 10 shows an illustrative diagram in accordance with principles of the disclosure.

FIG. 10 shows an exemplary customer support request sentiment analysis report. In the sentiment analysis report, the various parameters that may affect the sentiment analysis used for routing of the customer support request, may be analyzed separately.

The parameters may include support requests in the form of biometrics (1002), verbal sentiments (1004), conversational tone (1006), telephone call parameters (1008) and thread analysis parameters (1010). Exemplary components of the analysis for each of the parameters may be shown at 1012 (body temperature, bodily movement), 1014 (voice analysis, syntax, sentence structure), 1016 (content, relationship to other party), 1018 (call circumstance, location of other party) and 1020 (historical statements in thread, other social media thread statements, etc.). It should be appreciated that the analysis shown in FIG. 10 may be based on a polarity-based scoring model (as described above in more detail). However, any suitable scoring model may be used to generate an analysis.

Such a sentiment analysis report may be useful in determining which support request is the most urgent. Such an analysis report also preferably takes into account the requester's current state of emotions, as well as the historical context in which the request is being made.

Figure 11:
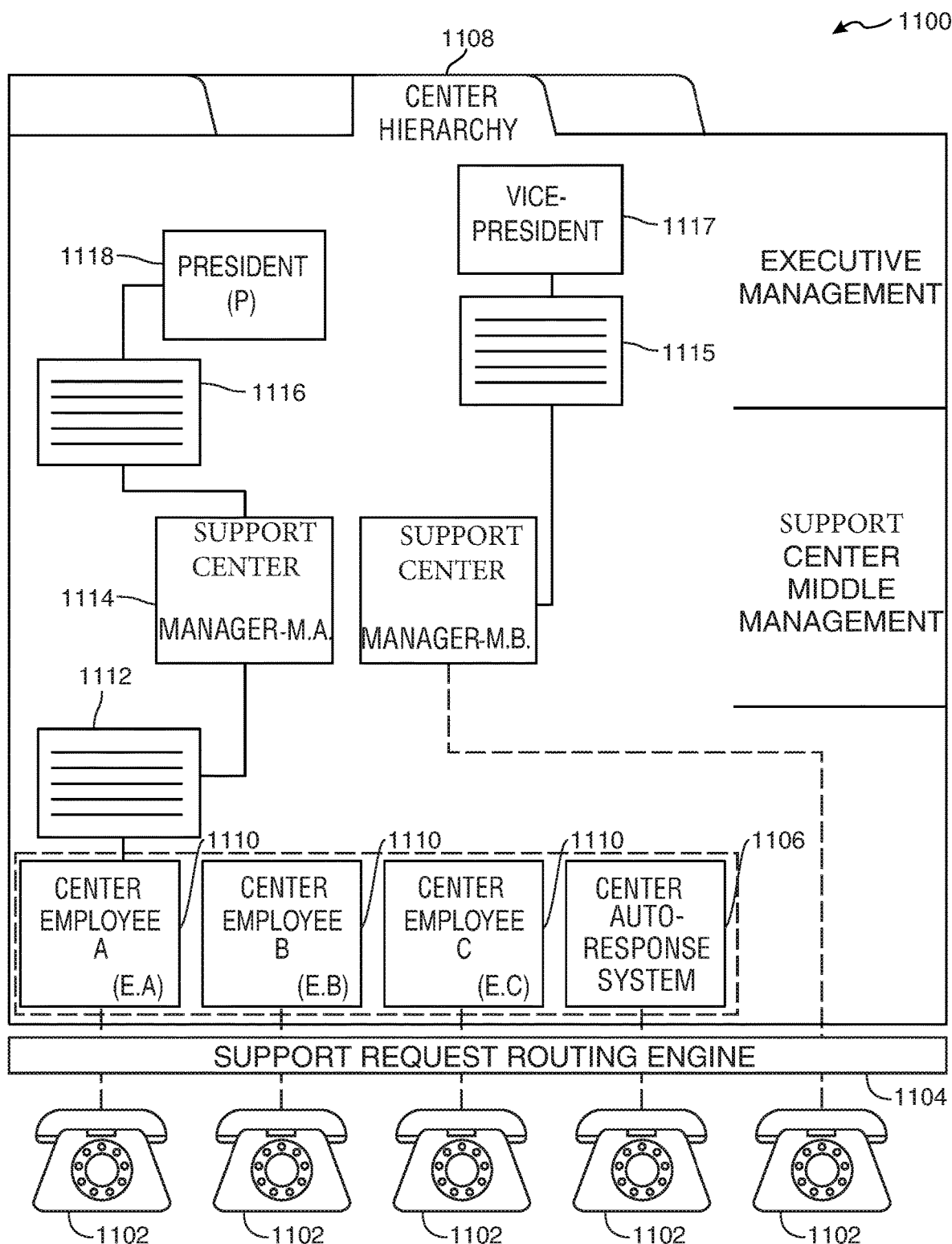
FIG. 11 shows an exemplary support center hierarchy.

FIG. 11 shows an illustrative diagram of a hierarchy 1108 of an exemplary support center 1100 according to certain embodiments. Support requester call-in devices are shown at 1102. These devices are shown as calling in to a support request routing engine 1104. Engine 1104 interfaces between the requesters and center 1100.

At 1112, escalation option is shown. This escalation option preferably enables a support center employee to escalate a matter to support center middle management. Support center middle management may include one or more support center managers 1114 (shown as Manager A, M.A., and Manager B, M.B.).

Executive management shows vice president 1117, accessible by escalation option 1115, and president 1118, accessible by escalation option 1116.

Hierarchy 1108 visually indicates that calls may be routed from call-in devices 1102 to support request routing engine 1104. From support request routing engine 1104 calls may be routed to one of the support center employees A-C, or auto-response systems such as auto-response system 1106. In certain exceptional situations, calls may be routed from engine 1104 directly to a manager 1114 (M.B.).

Engine 1104 may preferably route the support request based on context and request parameters of the request in combination with the customer sentiment derived at least in part from social media artifacts, as shown in detail in FIGS. 2-4, and especially at element 206 of FIG. 2.

Figure 12:
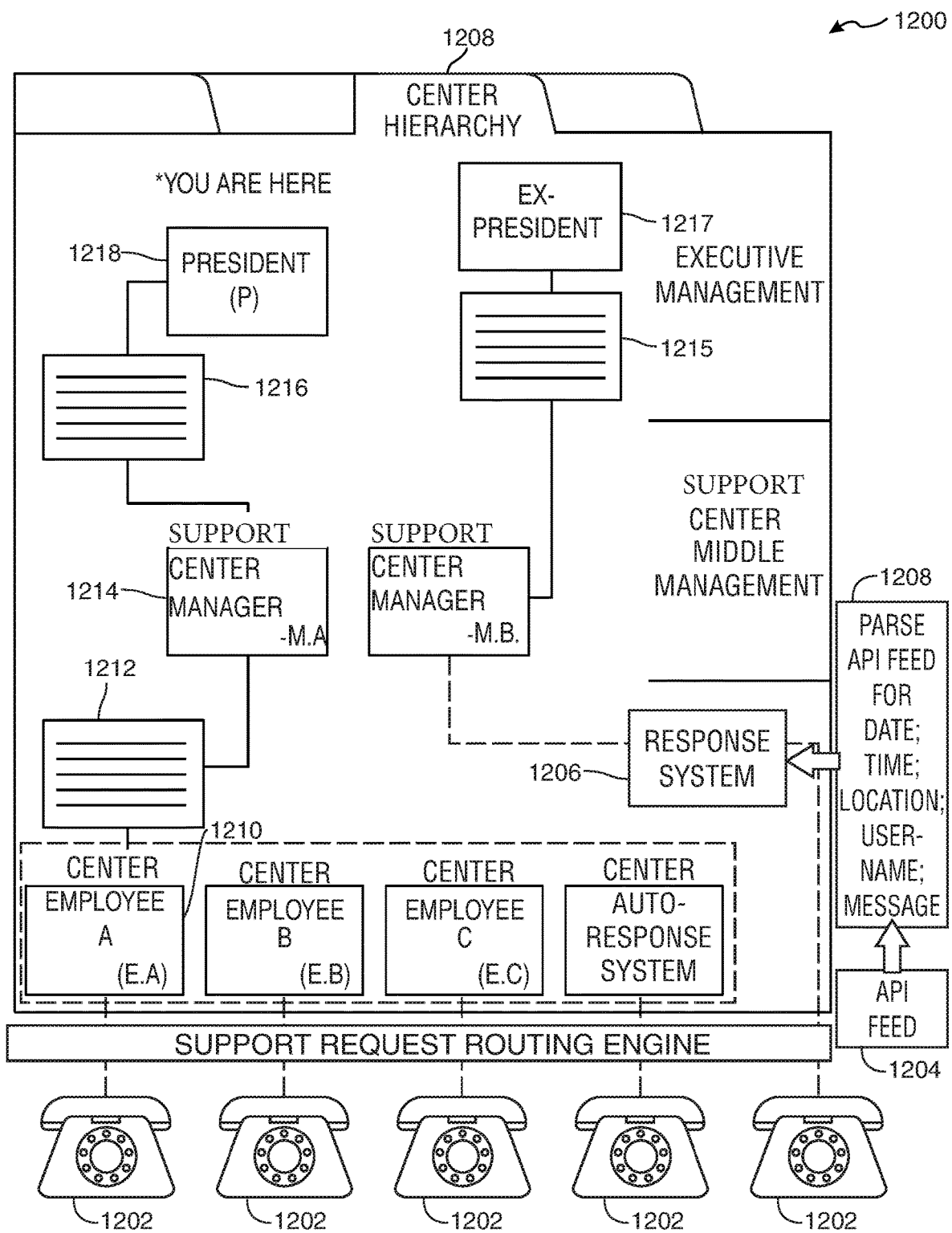
FIG. 12 shows another exemplary support center hierarchy.

FIG. 12 shows a support center hierarchy 1206 similar to the support center hierarchy 1106 shown in FIG. 11. As depicted, elements 1202, 1204, 1206, 1210, 1212, 1214, 1215, 1216, 1217, and 1218 are all similar to the corresponding elements 1102, 1104, 1106, 1110, 1112, 1114, 1115, 1116, 1117, and 1118 shown in FIG. 11.

FIG. 12 additionally shows an API feed 1230, a parsing engine 1232 for parsing the API feed and a response system 1234. It should be noted that, in some embodiments, API feed 1230 and parsing engine 1232 may be included as components of response system 1234. In other embodiments, API feed 1230 and parsing engine 1232 may be separate from response system 1234. Both of the foregoing options—i.e., where API feed 1230 and parsing engine 1232 are included as components of response system 1234, and where API feed 1230 and parsing engine 1232 are separate from response system 1234, are within the scope of the current disclosure.

API feed 1230 preferably acts as a conduit to receive support requests in the form of social media communications such as Tweets. Once the support requests have been received, the support requests may be parsed by parsing engine 1232 for date, time, location, name of requester and message content. Thereafter, response system 1234 may redirect the support request to either an employee in the support center 1210, auto-response system in the support center 1206 or a manager 1214.

Algorithms at use in response system 1234 may preferably take into account the sentiment score related to the support request, such as sentiment score 122 set forth in FIG. 1. In some embodiments, response system 1234 may route the request based on the historical information available in API feed 1230 associated with the incoming support request. As such, response system 1234 may query API feed 1230.

Furthermore, response system 1234 may also, in certain embodiments, preferably route the support request based on context and request parameters of the request in combination with the customer sentiment derived at least in part from social media artifacts, as shown in detail in FIGS. 2-4, and especially at element 206 of FIG. 2.

Figure 13:
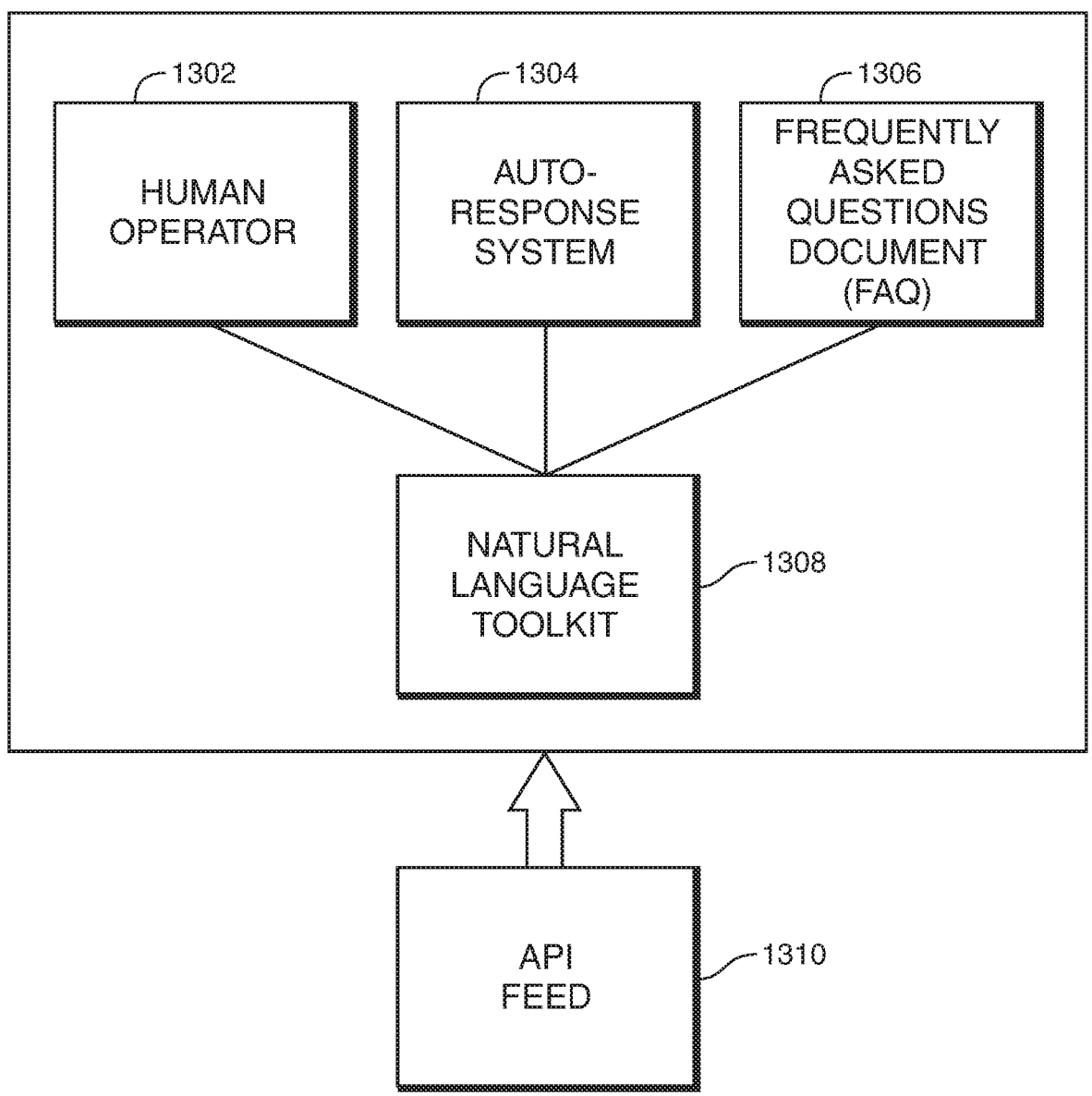
FIG. 13 shows an API response system (or other social communications media system) for use according to certain embodiments.

FIG. 13 shows, in more detail, an API response system (or other social communications media system). The system shown in FIG. 13 shows an exemplary schematic rendering of response system 1234 shown in FIG. 12.

The system shown in FIG. 13 may include, for example, an API feed 1310. This may be an internal feed—i.e., within an entity or the system independently—or an external feed that receives support requests.

The system may include a natural language toolkit 1308. Toolkit 1308 may be used for parsing an incoming support request for sentiment analysis.

Once the support request has been parsed, and analyzed for customer sentiment, the support request may be routed to 1) a human operator 1302, 2) an auto-response system 1314 and/or 3) a frequently asked questions (FAQ) repository 1306.

Figure 14:
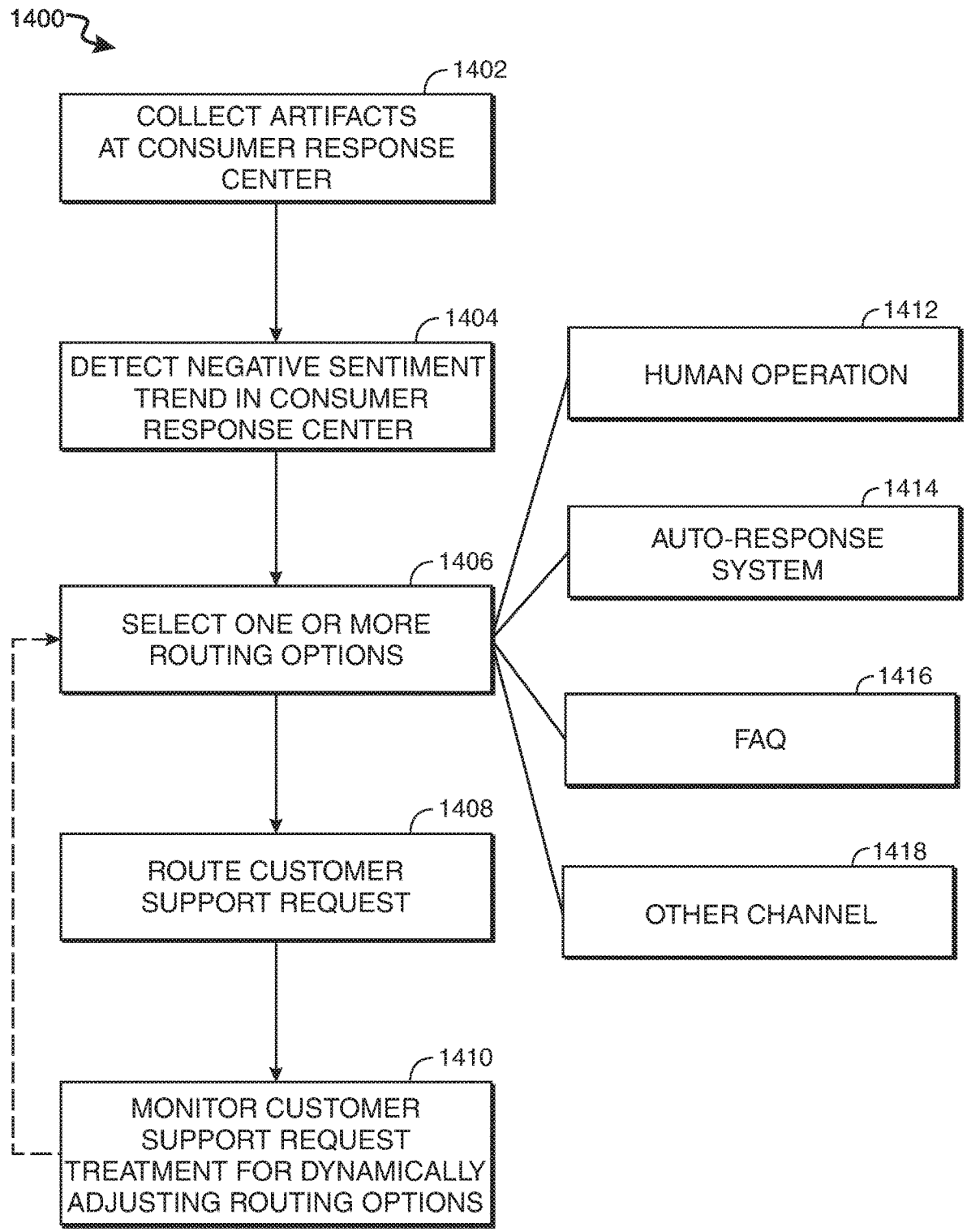
FIG. 14 shows an illustrative flow diagram for detecting a negative trend among customer support requests and providing a response thereto.

FIG. 14 shows an illustrative flow diagram 1400 for detecting a negative trend and responding thereto. Illustrative flow diagram 1400 may utilize a public API or other device to collect artifacts, as shown at 1402.

Based on this information, illustrative flow diagram 1400 may detect a negative sentiment trend, as shown at 1404. It should be noted that this detection may occur at the dashboard level, or using a dashboard. In any case, flow 1400 may exist with or without dashboard utilization.

At step 1406, flow 1400 may include auto-selecting, in response to detection of a negative sentiment trend at 1404, one or more trend-mitigating options. Such selection may be based on machine learning (ML) that is based on the success or failure of historical trend mitigating options. Furthermore, such selection can be tuned, as set forth in more detail below with regards to the portion of the specification relating to post trend mitigation feedback 1410.

Such trend-mitigating options may include transmission of one or more e-mails (to relevant parties) 1412, transmission of one or more electronic-text messages (to relevant parties) 1414, transmission of one or more electronically-generated telephone calls (to relevant parties) 1416 and transmission of one or more electronically-generated chat communications (to relevant parties) 1418. Such transmission, with trend-mitigating messaging, may serve to offset other trend-generating stimuli.

Thereafter, flow 1400 may include invoking trend-mitigating option 1406. Following invocation of trend-mitigating option 1406, flow 1400 may include receiving post trend mitigation feedback, as shown at 1410. Such feedback 1410 may be used to select one or more additional trend-mitigating options as shown at 1406 in an additional round(s) of trend mitigation. It should be noted that ML may be used to select which option should be used to further mitigate. For example, trend-mitigating text-messaging may be invoked when an immediate trend-mitigation response is called for.

Figure 15:
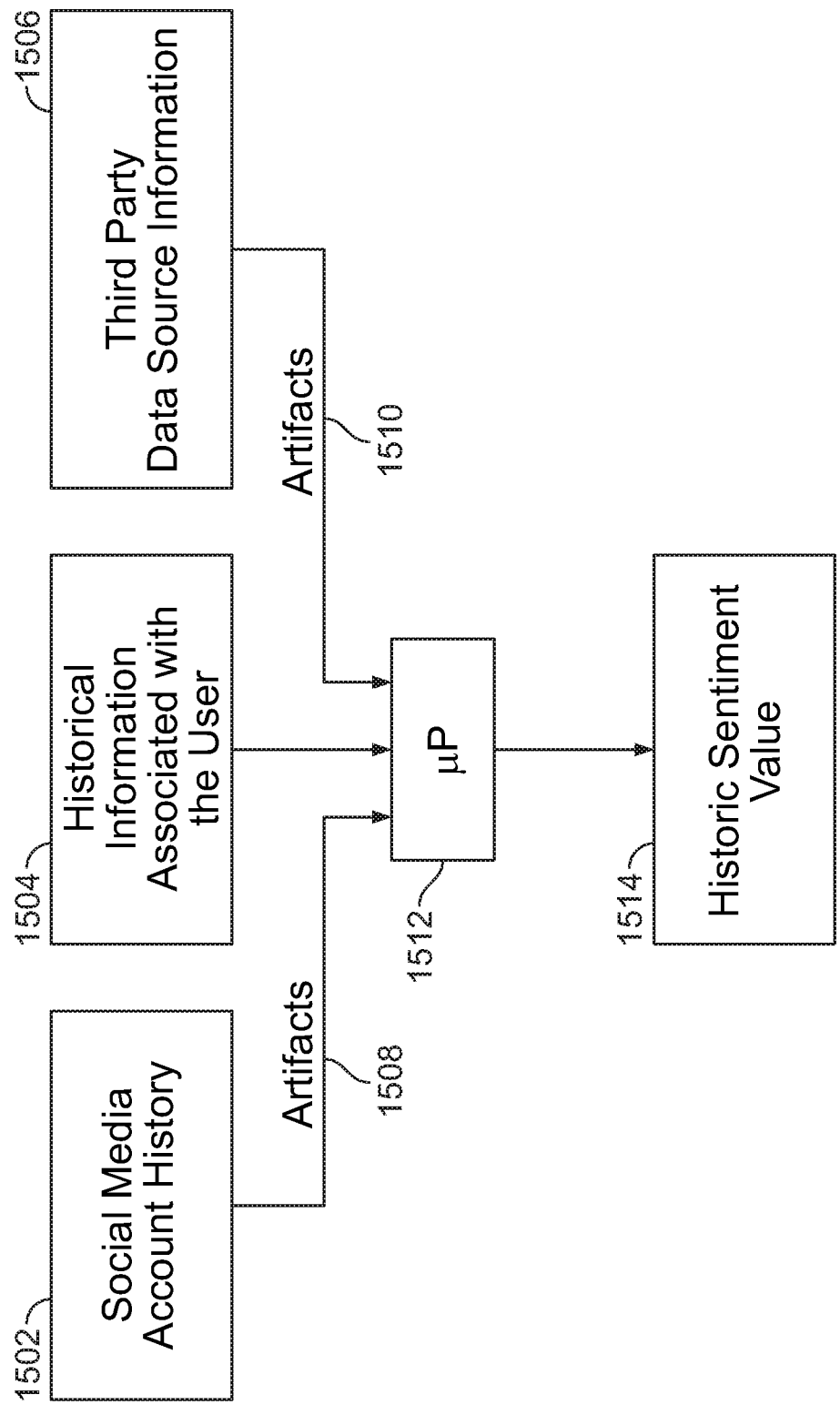
FIG. 15 shows an illustrative hybrid schematic diagram for leveraging social media data for routing customer service requests.

FIG. 15 shows an illustrative hybrid schematic diagram for leveraging social media data for routing customer service requests. Social media account history data 1502 includes artifacts 1508. Third party data source information 1506 includes other artifacts 1510. Artifacts 1508 and 1510 are both related either to a user and/or to a user communication device. All artifacts 1508 and 1510 preferably include sentiment information, as described above, that relate to the user and/or the user communication device. Furthermore, historical information 1504 also preferably reveals information relating to the sentiment of a user. Such historical information may include previous history of the user and/or communication device vis-à-vis the system. It should be noted that more recent historical information may be given more weight than less recent historical information.

Microprocessor 1512 preferably receives artifacts 1508 related to the social media account history 1502, historical information 1504 associated with the user and artifacts 1510 related to third party data source information 1506. Based on these various categories of information, microprocessor 1512 preferably calculates a historical sentiment value 1514. The historical sentiment value may characterize the requester's current state in view of his or her historical response to other situations similar to the one for which he or she is currently request support.

Figure 16:
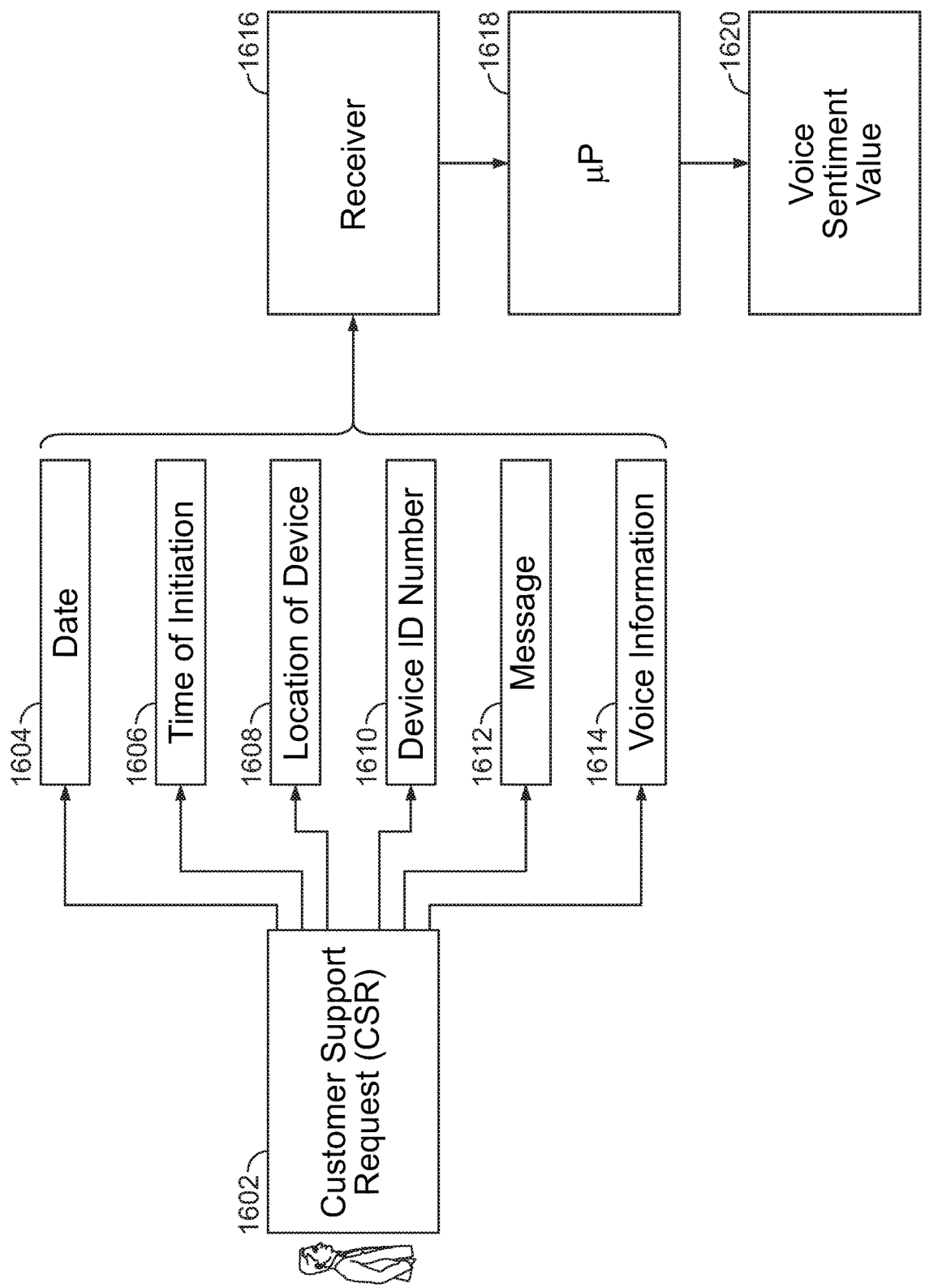
FIG. 16 shows an illustrative schematic diagram that illustrates one exemplary way to derive a voice sentiment value.

FIG. 16 shows an illustrative schematic diagram that illustrates one exemplary way to derive a voice sentiment value—an indication of the requestor's sentiment as it is expressed in his or her voice. The voice-generated customer support request is shown at 1602.

The voice-based customer support request typically includes a date 1604, a time of initiation 1606, a location of the device which is transmitting the information 1608, a device ID number 1610, a message 1612 and/or voice information 1614. All the foregoing information is preferably received and preferably stored by receiver 1616.

Microprocessor 1618 (it should be noted that all microprocessors illustrated and/or described herein may be the same—i.e., a single microprocessor—or may be different microprocessors) may preferably derive from one or more than one of 1604-1618 a voice sentiment value 1620. Voice sentiment value 1620 may preferably provide an indication of the requestor's sentiment as it is expressed in his or her voice-communicated customer support request.

Such derivation of voice sentiment value 1620 may preferably provide an indication of the requester's current emotional state, the requester's current health state, or other aspects of the requester's current psychological/physical/financial state or other relevant state.

Figure 17:
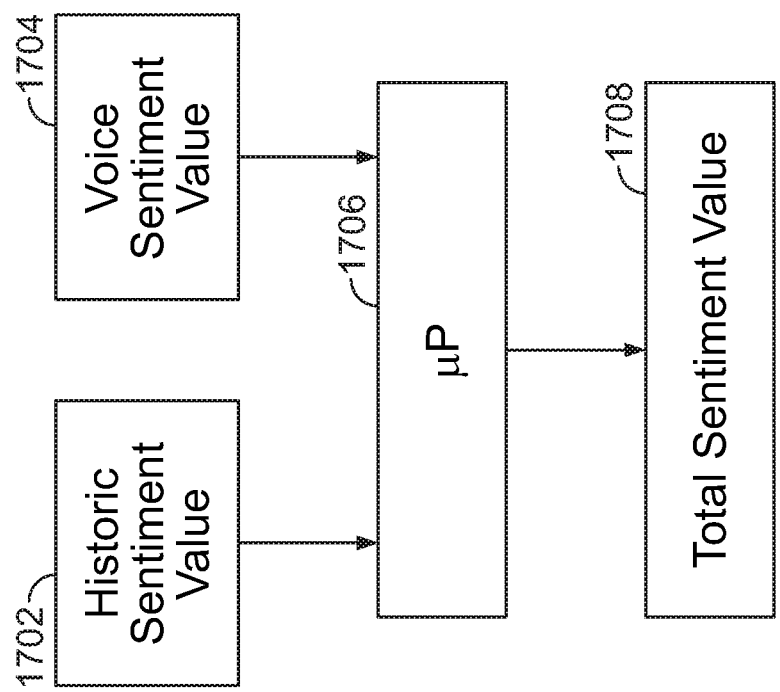
FIG. 17 shows an exemplary schematic diagram that shows a microprocessor for combining, for analysis, historical sentiment value with voice sentiment value.

FIG. 17 is an exemplary schematic diagram that shows microprocessor 1706 combining, for analysis, historical sentiment value 1702 with voice sentiment value 1704. The combination of historical sentiment value 1702 with voice sentiment value 1704 enables the system to more finely tune the analysis of the sentiment of the requester. It should be noted, however, that in certain embodiments, only one or the other sentiment value may be used to analyze the sentiment of the requester. It should also be noted that one or the other sentiment value, or one or more components of each, may be weighted to arrive at different desired outcomes.

In response to analyzing the one or both of historical sentiment value 1702 with voice sentiment value 1704, microprocessor 1706 may preferably obtain a total sentiment value.

Figure 18:
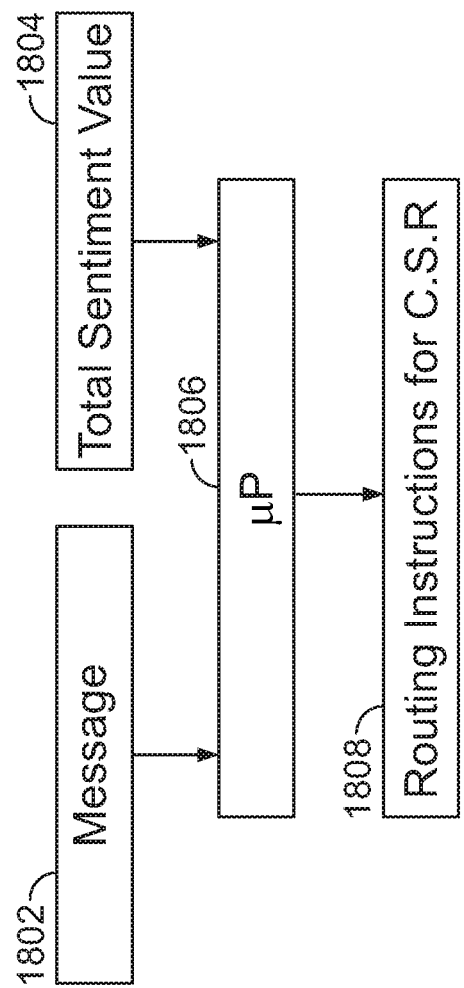
FIG. 18 shows an exemplary flow diagram for producing routing instructions for a customer support request.

FIG. 18 shows an exemplary flow diagram for producing routing instructions for a customer support request. A message 1802 that forms the customer support request may preferably be retrieved by microprocessor 1806. The total sentiment value 1804 may preferably be retrieved by microprocessor 1806. These two pieces of information—i.e., message 1802 and the total sentiment value 1804—may preferably be retrieved by microprocessor 1806 in order to generate routing instructions for the customer support request, as shown at 1808.

Such routing instructions may include routing the customer request to any one or more of the following:

1) A highly-qualified human responder;
2) A newly-hired human responder;
3) A chat responder (when the user is requesting support using a chat-enabled device);
4) An e-mail responder (when the user is requesting support using an e-mail-enabled device);
5) An interactive voice response (IVR) system;
6) Interactively provided customer support selection options (for a human responder, press 1, for a chat responder press 2, etc.)
7) A combination of one or more of the foregoing.

It should be reiterated that an in-depth knowledge of a requester's sentiment, especially knowledge that takes into account historical sentiment as well as voice-derived current sentiment, may be useful in determining which routing option is at least appropriate and, at best, optimal for a newly-received customer support request. The sentiment context from which the request was generated (both the historical context as well as the current context) may influence the approach to responding to the customer support request.

It should also be noted that the time of response of the system may also be determined based on account historical sentiment as well as voice-derived current sentiment. For example, a customer support request that is determined, from any reliable source, to be urgent may preferably be acted on more quickly, thereby improving response accuracy and appropriateness to high priority situations, than a customer support request that is determined to be relatively less urgent.

Figure 19:
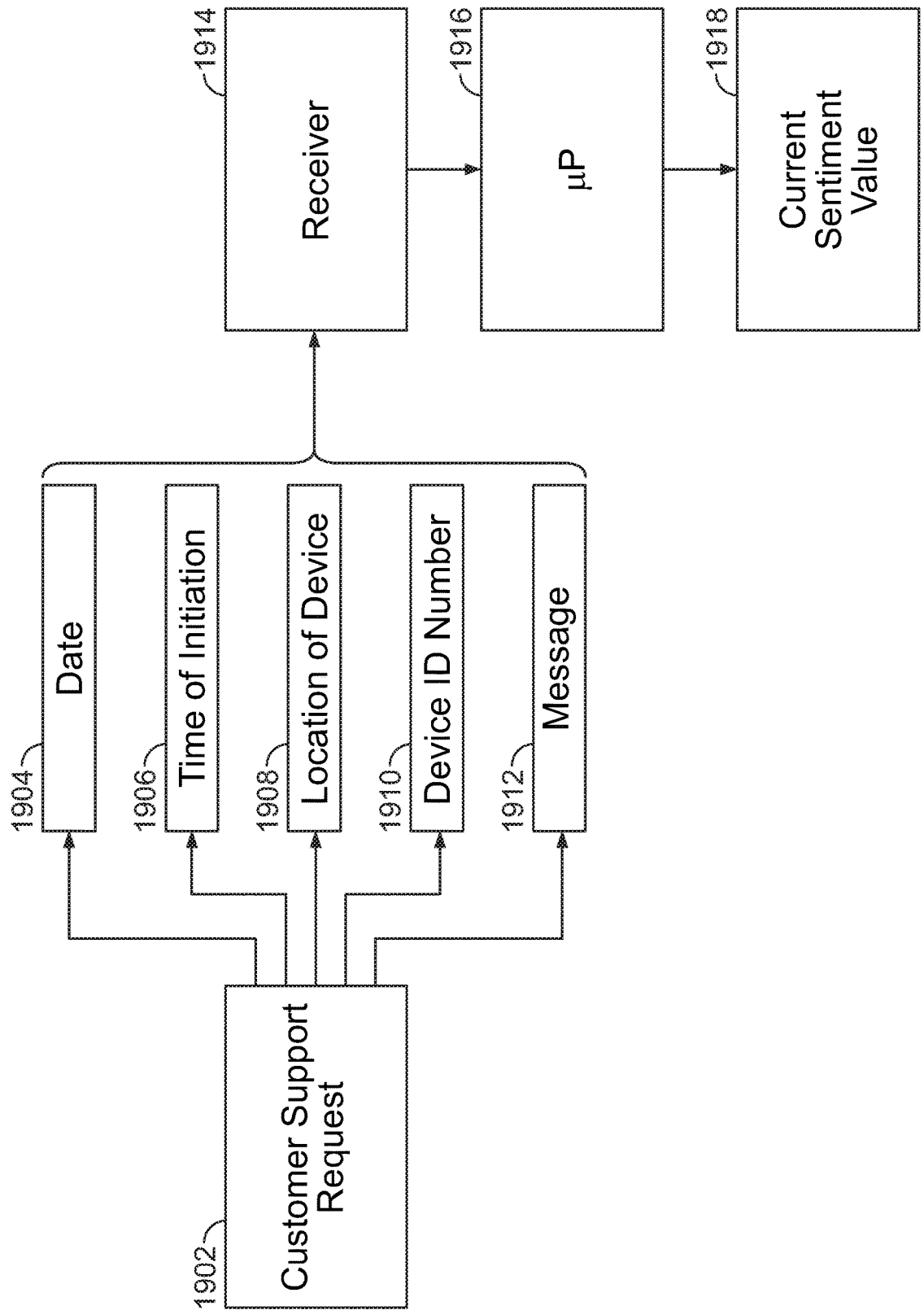
FIG. 19 shows an exemplary customer service request according to certain embodiments.

FIG. 19 shows an embodiment of an exemplary customer service request 1902. Such a customer service request 1902 may include a date 1904, a time of initiation 1906, a location of device which is transmitting the information 1908, a device ID number 1910 and/or a message 1912.

Receiver 1914 preferably receives and stores the information in customer support request 1902. This occurs preferably under the instruction of microprocessor 1916. Thereafter, microprocessor 1918 derives a current sentiment value 1918 associated with the customer support request 1902. In certain embodiments, microprocessor may also derive a historical sentiment value (not shown in FIG. 19) similar to the process shown in FIG. 15, which illustrates microprocessor 1512 deriving a historical sentiment value 1514 based on historical information as well as third party artifacts.

Figure 20:
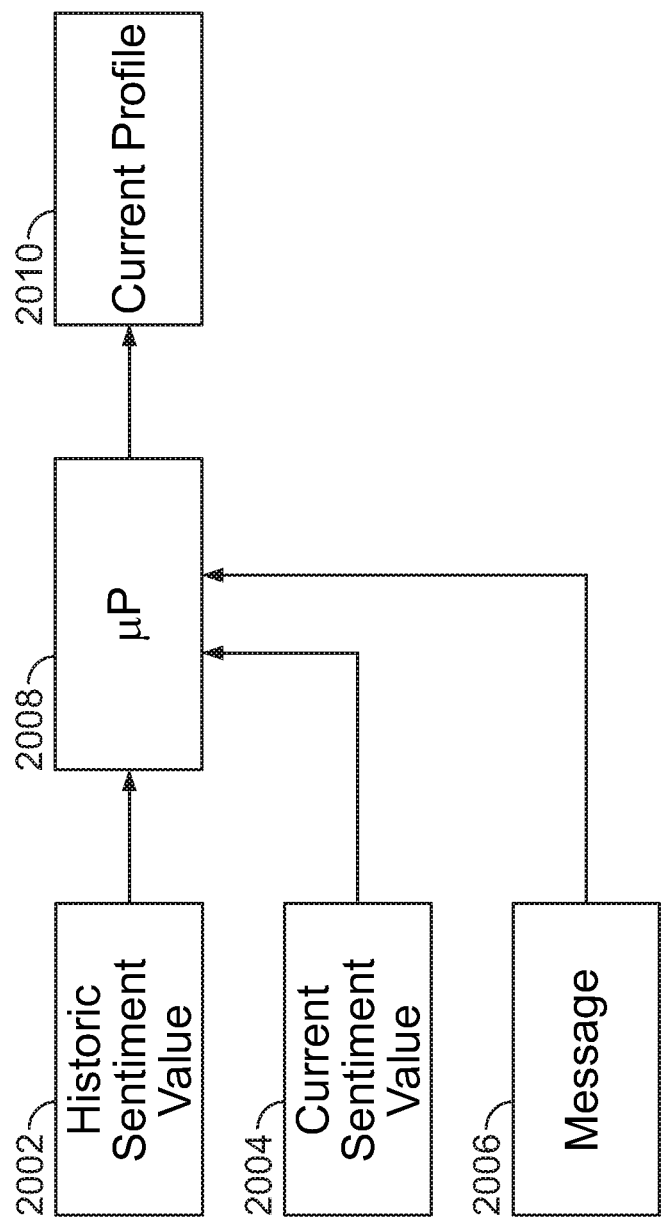
FIG. 20 shows using a microprocessor to convert historical sentiment value, current sentiment value and message information into a current profile.
Figure 21:
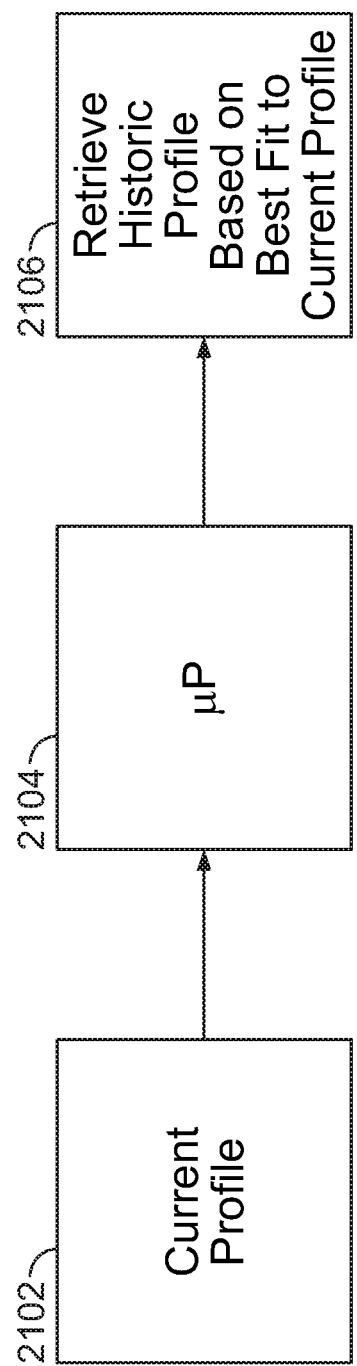
FIG. 21 shows using a microprocessor to analyze a current profile and retrieving a historical profile based on a best fit to the current profile to the current profile.

FIG. 20 shows using microprocessor 2008 to convert historical sentiment value 2002, current sentiment value 2004 and message information 2006 into a current profile 2010. FIG. 21 then shows using microprocessor 2014 to analyze current profile 2102 and retrieving a historical profile based on a best fit to the current profile 2106—i.e., processor retrieves a profile that shares the most common characteristics with the current profile. While a best fit algorithm is described herein to obtain an historical customer service request profile and feedback associated therewith that fits most closely with the current customer service request, it should be noted that any suitable data comparison algorithm may be used to obtain relevant historical information regarding to provide context for responding to the customer service request.

Figure 22:
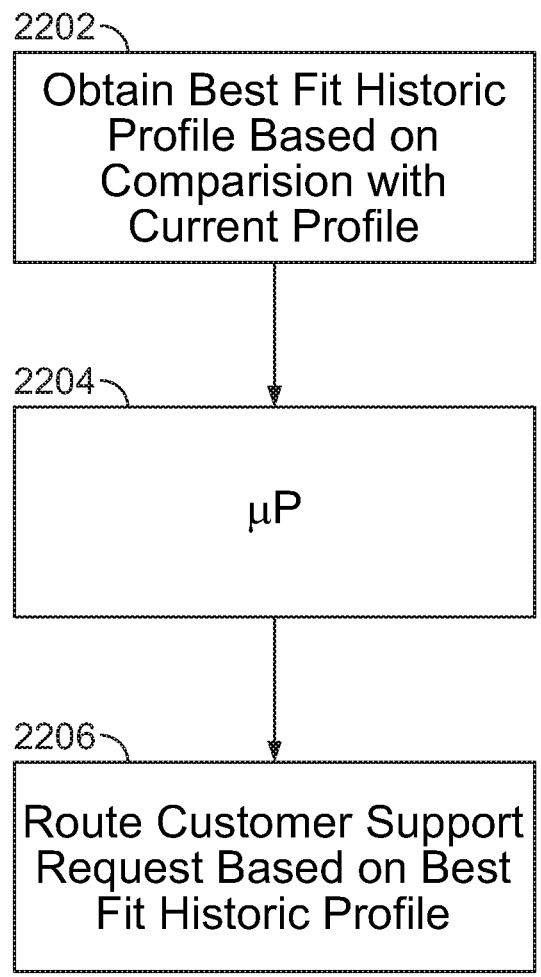
FIG. 22 shows using a microprocessor to route a customer request in preferably the most efficient way based on the lessons learned from the routing of, and preferably feedback associated with, one or more customer requests that fit fall within a historical profile.

Thereafter, as shown in FIG. 22, microprocessor 2204 routes customer service requests in preferably the most efficient way based on the information derived from the routing of, and feedback associated with, one or more customer requests that fall within the historical profile. Algorithms that determine the most efficient way, or relatively higher efficiency paths, to route customer service requests preferably take into account the relevant history of the customer requests that fall within the historical profile. Based on this relevant history, the microprocessor may make routing decisions regarding the customer support request that is currently being analyzed.

Thus, a customer-sentiment driven workflow based on social media data and voice information, is provided. Persons skilled in the art will appreciate that the present invention can be practiced by other than the described embodiments, which are presented for purposes of illustration rather than of limitation. The present invention is limited only by the claims that follow.

What is claimed is:

1. A system for leveraging voice information derived from a telephone request for customer support ("RCS"), said leveraging for improving the accuracy of a sentiment analysis performed on a customer support request, the system comprising:

a receiver configured to receive voice information from a teleconference, the teleconference intended to communicate a customer support request, said customer support request comprising:
a date of the customer support request;
a time of initiation of the customer support request;
a location of a communication device that was used to communicate the customer support request;
a device identification number associated with the customer support request;
a message derived from the customer support request; and
voice information associated with the customer support request;

a processor, said processor configured, for each customer support request, to harvest a plurality of artifacts from social media account history and/or other third party data source information associated with a user and further associated with the device identification number, each of said plurality of artifacts comprising sentiment information relevant to the customer support request;

wherein the processor is further configured to calculate, for each customer support request, a historical sentiment value, the calculation of said historical sentiment value being based, at least in part, on the plurality of artifacts and the historical information associated with the user;

wherein the processor is further configured to obtain, for each customer support request, a voice sentiment value from the voice information; and wherein the processor is further configured to calculate, for each customer support request, a total sentiment value based on the historical sentiment value and the voice sentiment value, and to route the customer request based on the total sentiment value and the message.

2. The system of claim 1, wherein the relevance of the sentiment information is inversely proportional to the magnitude of time between the date and the time associated with the artifact and the date and the time of the customer support request.

3. The system of claim 1, wherein each of the users pre-registers for the sentiment analysis prior to sending in the customer support request.

4. The system of claim 1, wherein the processor is further configured to calculate the voice sentiment value based, at least in part, on one or more of a tone of the voice, a cadence of the voice, an intensity of the voice and historical information associated with the user.

5. The system of claim 1, wherein the historical information further comprises a historical baseline tone of the voice, a historical baseline cadence of the voice, and a historical baseline intensity of the voice.

6. The system of claim 1, wherein the message is derived from the customer support request using natural language processing.

7. The system of claim 1, wherein the routing the customer support request further comprises selecting a level from among a plurality of levels defined in a vertical stratification of the entity and matching that level with information contained within the message, said matching comprising determining a threshold level of matching between the message and the level.

8. A method for leveraging voice information derived from a telephone request for customer support ("RCS"), said leveraging for improving the accuracy of a sentiment analysis performed on a customer support request, the method comprising:
   receiving, using a receiver, voice information from a teleconference, the teleconference comprising a customer support request, the customer support request comprising:
      a date of the customer support request;
      a time of initiation of the customer support request;
      a location of a communication device that was used to communicate the customer support request;
      a device identification number associated with the customer support request;
      a message derived from the customer support request; and
      voice information associated with the customer support request;
   for each customer support request, harvesting, using a processor, a plurality of artifacts from social media account history and/or other third party data source information associated with a user further associated with the device identification number, each of said plurality of artifacts comprising sentiment information relevant to the customer support request;
   wherein the processor is further configured to calculate, for each customer support request, a historical sentiment value, the calculation of said historical sentiment value being based, at least in part, on the plurality of artifacts and the historical information associated with the user;
   wherein the processor is further configured to obtain, for each customer support request, a voice sentiment value from the voice information; and
   wherein the processor is further configured to calculate, for each customer support request, a total sentiment value based on the historical sentiment value and the voice sentiment value, and to route the customer request based on the total sentiment value and the message.

9. The method of claim 8, wherein the relevance of the sentiment information is inversely proportional to the magnitude of time between the date and the time associated with the artifact and the date and the time of the customer support request.

10. The method of claim 8, wherein the system is configured to enable the user to pre-register for the sentiment analysis prior to sending in the customer support request.

11. The method of claim 8, wherein the processor is further configured to calculate the voice sentiment value based, at least in part, on one or more of a tone of the voice, a cadence of the voice, an intensity of the voice and historical information associated with the user.

12. The method of claim 11, wherein the historical information further comprises a historical baseline tone of the voice, a historical baseline cadence of the voice, and a historical baseline intensity of the voice.

13. The method of claim 8, wherein the message is derived from the customer support request using natural language processing.

14. The method of claim 8, wherein the routing the customer support request further comprises selecting a level from among a plurality of levels defined in a vertical stratification of the entity and matching that level with information contained within the message, said matching comprising determining a threshold level of matching between the message and the level.

15. A system for leveraging voice information derived from a telephone request for customer support ("RCS"), said leveraging for improving the accuracy of a sentiment analysis performed on a customer support request, the system comprising:
   a receiver configured to receive a plurality of logins, each of the logins intended to initiate a customer support request, said customer support request comprising:
      a date of the customer support request;
      a time of initiation of the customer support request;
      a location of a communication device that was used to communicate the customer support request;
      a device identification number associated with the customer support request;
      a message derived from the customer support request; and
      voice information associated with the customer support request;
   a processor, said processor configured to calculate, for each customer support request, a historical sentiment value, the calculation of said historical sentiment value being based, at least in part, on a plurality of artifacts retrieved historical information associated with the user;
   wherein the processor is further configured to obtain, for each customer support request, a voice sentiment value from the voice information; and
   wherein the processor is further configured to calculate, for each customer support request, a total sentiment value based on the historical sentiment value and the voice sentiment value, and to route the customer request based on the total sentiment value and the message.

16. The system of claim 15, wherein the relevance of the sentiment information is inversely proportional to the magnitude of time between the date and the time associated with the artifact and the date and the time of the customer support request.

17. The system of claim 15, wherein each of the users pre-registers for derivation of the historical sentiment value prior to initiation of the customer support request.

18. The system of claim 15, wherein the processor is further configured to calculate the voice sentiment value based, at least in part, on one or more of a tone of the voice, a cadence of the voice, an intensity of the voice and historical information associated with the user.

19. The system of claim 18, wherein the historical information further comprises a historical baseline tone of the voice, a historical baseline cadence of the voice, and a historical baseline intensity of the voice.

20. The system of claim 19, wherein the message is derived from the customer support request using natural language processing.

21. The system of claim 15, wherein the routing the customer support request further comprises selecting a level from among a plurality of levels defined in a vertical stratification of the entity and matching that level with information contained within the message, said matching comprising determining a threshold level of matching between the message and the level.

* * * * *